US010305328B2

(12) United States Patent
Tsuda et al.

(10) Patent No.: US 10,305,328 B2
(45) Date of Patent: May 28, 2019

(54) WIRELESS POWER TRANSMISSION DEVICE CAPABLE OF FORMING MAGNETIC FIELD SPACE, AND MAGNETIC FIELD SPACE FORMATION METHOD

(71) Applicant: NITTO DENKO CORPORATION, Ibaraki-shi, Osaka (JP)

(72) Inventors: Hisashi Tsuda, Ibaraki (JP); Takezo Hatanaka, Ibaraki (JP); Masami Inoue, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 95 days.

(21) Appl. No.: 15/029,836

(22) PCT Filed: Sep. 24, 2014

(86) PCT No.: PCT/JP2014/075330
§ 371 (c)(1),
(2) Date: Apr. 15, 2016

(87) PCT Pub. No.: WO2015/056539
PCT Pub. Date: Apr. 23, 2015

(65) Prior Publication Data
US 2016/0254701 A1 Sep. 1, 2016

(30) Foreign Application Priority Data
Oct. 15, 2013 (JP) .................................. 2013-214846

(51) Int. Cl.
*H02J 5/00* (2016.01)
*H02J 7/02* (2016.01)
(Continued)

(52) U.S. Cl.
CPC .............. *H02J 50/12* (2016.02); *H02J 5/005* (2013.01); *H02J 7/025* (2013.01); *H02J 50/50* (2016.02)

(58) Field of Classification Search
CPC .. H02J 5/005; H02J 7/025; H02J 17/00; H02J 50/12
(Continued)

(56) References Cited

U.S. PATENT DOCUMENTS 9,815,380 B2* 11/2017 Koizumi ............... B60L 11/182
9,843,226 B2* 12/2017 Lee ......................... H02J 5/005
(Continued)

FOREIGN PATENT DOCUMENTS

CN  102197567 A  9/2011
CN  102439669 A  5/2012
(Continued)

OTHER PUBLICATIONS

Mar. 21, 2017 Office Action issued in Korean Patent Application No. 10-2016-7012338.
(Continued)

*Primary Examiner* — Levi Gannon
(74) *Attorney, Agent, or Firm* — Oliff PLC

(57) ABSTRACT

A wireless power transmission device supplies power by means of a resonance phenomenon, from a power supply module equipped with at least a power-supply resonator to a power-receiving module equipped with at least a power-receiving resonator. For the power-supply resonator and the power-receiving resonator, a value for a transmission characteristic of a power source frequency for power is set so as to have two peak bands, and By setting the power source frequency for the power supplied to the power supply module to the power source frequency band corresponding to one of the two peak bands of the transmission character-
(Continued)

istic, magnetic field spaces having a magnetic field strength less than the surrounding magnetic field strength are formed in the area near the power-supply resonator and the power-receiving resonator.

8 Claims, 18 Drawing Sheets

(51) Int. Cl.
*H02J 50/12* (2016.01)
*H02J 50/50* (2016.01)

(58) Field of Classification Search
USPC .......................................................... 307/104
See application file for complete search history.

(56) References Cited

U.S. PATENT DOCUMENTS

| | | | |
|---|---|---|---|
| 2010/0187913 A1* | 7/2010 | Smith | H02J 5/005 307/104 |
| 2010/0213770 A1* | 8/2010 | Kikuchi | H01Q 1/248 307/104 |
| 2010/0219695 A1* | 9/2010 | Komiyama | H01Q 9/04 307/104 |
| 2010/0244578 A1 | 9/2010 | Yoshikawa | |
| 2010/0244580 A1 | 9/2010 | Uchida et al. | |
| 2012/0019075 A1 | 1/2012 | Cho et al. | |
| 2012/0032521 A1 | 2/2012 | Inoue et al. | |
| 2012/0133212 A1 | 5/2012 | Kamata | |
| 2012/0161537 A1 | 6/2012 | Kamata | |
| 2012/0326499 A1 | 12/2012 | Ichikawa et al. | |
| 2013/0015720 A1 | 1/2013 | Shimokawa et al. | |
| 2013/0127242 A1 | 5/2013 | Ichikawa | |
| 2014/0246919 A1 | 9/2014 | Hatanaka et al. | |
| 2015/0015084 A1 | 1/2015 | Ichikawa | |
| 2015/0054348 A1 | 2/2015 | Akiya | |
| 2016/0001669 A1* | 1/2016 | Ichikawa | H02J 5/005 307/10.1 |

FOREIGN PATENT DOCUMENTS

| | | |
|---|---|---|
| CN | 102754305 A | 10/2012 |
| CN | 103250325 A | 8/2013 |
| CN | 102570627 B | 3/2016 |
| EP | 2396796 A1 | 12/2011 |
| EP | 2400631 A1 | 12/2011 |
| EP | 2 985 882 A1 | 2/2016 |
| EP | 3 096 438 A1 | 11/2016 |
| JP | 2010-193598 A | 9/2010 |
| JP | 2010-239769 A | 10/2010 |
| JP | 2010-239847 A | 10/2010 |
| JP | 2011-147213 A | 7/2011 |
| JP | 2013-211933 A | 10/2013 |
| JP | 2013-239692 A | 11/2013 |
| TW | 201336199 A | 9/2013 |
| WO | 2010/093997 A1 | 8/2010 |
| WO | 2010/095281 A1 | 8/2010 |
| WO | 2012/132841 A1 | 10/2012 |
| WO | 2012/141028 A1 | 10/2012 |
| WO | 2012/157115 A1 | 11/2012 |
| WO | 2013/124977 A1 | 8/2013 |

OTHER PUBLICATIONS

Apr. 19, 2016 International Preliminary Report on Patentability issued in International Patent Application No. PCT/JP2014/075330.
Aug. 1, 2016 Office Action issued in Singaporean Patent Application No. 11201602949V.
Jul. 21, 2016 Office Action issued in Taiwanese Patent Application No. 103135736.
Nov. 4, 2014 International Search Report issued in International Patent Application No. PCT/JP2014/075330.
Nov. 4, 2014 Written Opinion issued in International Patent Application No. PCT/JP2014/075330.
Jul. 7, 2017 Search Report issued in European Patent Application No. 14853462.1.
Oct. 4, 2016 Office Action issued in Japanese Patent Application No. 2013-214846.
Nov. 3, 2017 Office Action issued in Chinese Patent Application No. 201480057032.3.
May 11, 2018 Office Action issued in European Application No. 14 853 462.1.
Sep. 4, 2018 Office Action issued in Chinese Patent Application No. 201480057032.3.
Mar. 4, 2019 Office Action issued in Chinese Patent Application No. 201480057032.3.

* cited by examiner

WIRELESS POWER TRANSMISSION DEVICE CAPABLE OF FORMING MAGNETIC FIELD SPACE, AND MAGNETIC FIELD SPACE FORMATION METHOD

TECHNICAL FIELD

The present invention relates to a wireless power transmission apparatus and a method which allow formation of magnetic field space having a weaker magnetic field strength than the strength of the surrounding magnetic field.

BACKGROUND

Portable electronic devices such as laptop PCs, tablet PCs, digital cameras, mobile phones, portable gaming devices, earphone-type music players, RF headsets, hearing aids, recorders, which are portable while being used by the user are rapidly increasing in recent years. Many of these portable electronic devices have therein a rechargeable battery, which requires periodical charging. To facilitate the work for charging the rechargeable battery mounted in an electronic device, there are an increasing number of devices for charging rechargeable batteries by using a power-supplying technology (wireless power transmission technology performing power transmission by varying the magnetic field) that performs wireless power transmission between a power-supplying module mounted in a charger and a power-receiving module mounted in an electronic device.

As a wireless power transmission technology, there have been known, for example, a wireless power transmission technology that performs power transmission by means of resonance phenomenon (magnetic field resonant state) between resonators (coils) provided to the power-supplying module and the power-receiving module (e.g. see PTL 1).

Further, according to the above-described wireless power transmission technology, a magnetic field is generated in the vicinity of the resonators of the power-supplying module and the power-receiving module, while a resonance phenomenon takes place between the resonators. Consequently, an Eddy Current occurs due to the magnetic field, thus generating heat in a stabilizer circuit, a charging circuit, a rechargeable battery, and other electronic components provided nearby the power-supplying module and the power-receiving module, which may cause with the result that an adverse effect may occur in the rectifier, and the stabilizer circuit, the charging circuit, the rechargeable battery, and the other electronic components may be adversely affected.

To address this issue of magnetic field, for example, PTL 2 discloses a power transmission system that is said to allow reduction of leak electromagnetic field in a power-supplying device configured to transmit power by means of contactless power transmission. Further, PTL 3 discloses a power transmission/reception device said to be capable of reducing magnetic field between a power-transmitting coil and a power-receiving coil.

CITATION LIST

Patent Literatures

PTL 1: Japanese Unexamined Patent Publication No. 2010-239769
PTL 2: Japanese Unexamined Patent Publication No. 2011-147213
PTL 3: Japanese Unexamined Patent Publication No. 2010-239847

SUMMARY OF INVENTION

Technical Problem

However, in regard to the power transmission system of PTL 2 and the power transmission/reception device of PTL 3, there is no mentioning of intentional formation of a magnetic field space with a lower magnetic field strength. To add this, the references provides no idea regarding at what magnitude the magnetic field space with a small magnetic field strength is generated in the power-supplying device and/or the power-receiving device, taking into account the sizes of the stabilizer circuit, the charging circuit, the rechargeable battery, and the other electronic components.

In view of the above problem, the present invention is made, and it is an object of the present invention to provide a wireless power transmission apparatus capable of intentionally forming a magnetic field space between a power-supplying module and a power-receiving module, the magnetic field space having a small magnetic field strength, and further capable of controlling the size of the magnetic field space with a small magnetic field strength; and to provide a method of forming such a magnetic field space.

Solution to Problem

An aspect of the present invention to achieve the above object is a wireless power transmission apparatus configured to supply power from a power-supplying module comprising at least a power-supplying resonator to a power-receiving module comprising at least a power-receiving resonator, by means of a resonance phenomenon, wherein setting is carried out so that a transmission characteristic with respect to the power-source frequency of the power, of the power-supplying resonator and the power-receiving resonator, has two peak bands; and the power-source frequency of the power to be supplied to the power-supplying module is set to a power-source frequency band corresponding to any of the two peak bands of the transmission characteristic, thereby forming a magnetic field space nearby the power-supplying resonator and the power-receiving resonator, the magnetic field space having a magnetic field strength smaller than a strength of a surrounding magnetic field.

With the above structure, it is possible to form a magnetic field space nearby the power-supplying resonator and the power-receiving resonator, the magnetic field space having a magnetic field strength smaller than the strength of the surrounding magnetic field, by carrying out the setting so that the transmission characteristic of the power-supplying resonator and the power-receiving resonator, at a time of wireless power transmission by means of a resonance phenomenon, has two peak bands, and by setting the power-source frequency of the power to be supplied to the power-supplying module to a power-source frequency band corresponding to any one of the two peak bands of the transmission characteristic.

By accommodating electronic devices that should be kept away from effects of a magnetic field, in the magnetic field space with a reduced magnetic field strength as compared with the strength of the surrounding magnetic field, the chances of Eddy current occurring due to the magnetic field is reduced or prevented in those electronic devices, and keep the devices away from negative effects stemming from heat generation.

Another aspect of the present invention to achieve the above object is the wireless power transmission apparatus adapted so that the power-source frequency of the power supplied to the power-supplying module is set to a frequency band corresponding to a peak band, out of the two peak bands of the transmission characteristic, on the high frequency side.

In the above structure, the power-source frequency of the power supplied to the power-supplying module is set to a frequency band corresponding to a peak band, out of the two peak bands of the transmission characteristic, on the high frequency side. This enables formation of a magnetic field space between the power-supplying resonator and the power-receiving resonator, the magnetic field space having a magnetic field strength smaller than the strength of the surrounding magnetic field.

Another aspect of the present invention to achieve the above object is the wireless power transmission apparatus adapted so that the power-source frequency of the power supplied to the power-supplying module is set to a frequency band corresponding to a peak band, out of the two peak bands of the transmission characteristic, on the low frequency side.

In the above structure, the power-source frequency of the power supplied to the power-supplying module is set to a frequency band corresponding to a peak band, out of the two peak bands of the transmission characteristic, on the low frequency side. This enables formation of a magnetic field space outside the power-supplying resonator and the power-receiving resonator, the magnetic field space having a magnetic field strength smaller than the strength of the surrounding magnetic field.

Another aspect of the present invention to achieve the above object is the wireless power transmission apparatus adapted so that the power-supplying module comprises at least a power-supplying coil and the power-supplying resonator; the power-receiving module comprises at least the power-receiving resonator and a power-receiving coil; and setting is carried out so that the transmission characteristic with respect to the power-source frequency of the power, of the power-supplying module and the power-receiving module, has a single-hump characteristic which exhibits a single peak.

In the above structure, setting is carried out so that the transmission characteristic with respect to the power-source frequency of the power, of the power-supplying module and the power-receiving module, has a single-hump characteristic which exhibits a single peak. This maximizes the transmission characteristic. Being able to maximize the transmission characteristic means the efficiency of power transmission from the power-supplying module to the power-receiving module is maximized. Therefore, it is possible improve the power transmission efficiency of the wireless power transmission, while forming a magnetic field space.

Another aspect of the present invention to achieve the above object is the wireless power transmission apparatus adapted so that the power-supplying module comprises at least a power-supplying coil and the power-supplying resonator; the power-receiving module comprises at least the power-receiving resonator and a power-receiving coil; and setting is carried out so that the transmission characteristic with respect to the power-source frequency of the power, of the power-supplying module and the power-receiving module, has a double-hump characteristic which exhibits two peaks.

In the above structure, setting is carried out so that the transmission characteristic with respect to the power-source frequency of the power, of the power-supplying module and the power-receiving module, has a double-hump characteristic which exhibits two peaks. By setting the power-source frequency nearby any of the two peak bands, it is possible to improve the power transmission efficiency of wireless power transmission, while forming a magnetic field space.

Another aspect of the present invention to achieve the above object is the wireless power transmission apparatus adapted so that the size of the magnetic field space is adjusted by adjusting the strength of magnetic coupling occurring between the power-supplying resonator and the power-receiving resonator through modification of one or more adjustment parameters related to the power-supplying module and the power-receiving module.

In the above structure, the size of the magnetic field space is adjustable by adjusting the strength of magnetic coupling occurring between the power-supplying resonator and the power-receiving resonator, through modification of one or more adjustment parameters related to the power-supplying module and the power-receiving module. For example, the size of the magnetic field space is increased by relatively weakening the magnetic coupling occurring between the power-supplying module and the power-receiving module. On the other hand, the size of the magnetic field space is reduced by relatively strengthening the magnetic coupling occurring between the power-supplying module and the power-receiving module.

As described, the size of the magnetic field space is adjustable according to the size of an electronic device that needs to be kept away from effects from a magnetic field.

Another aspect of the present invention to achieve the above object is the wireless power transmission apparatus adapted so that the one or more adjustment parameters include at least one of the distance between the power-supplying coil and the power-supplying resonator and the distance between the power-receiving resonator and the power-receiving coil.

With the above structure, the size of the magnetic field space is adjustable by adjusting the strength of the magnetic coupling, through modification of at least one of the distance between the power-supplying coil and the power-supplying resonator and the distance between the power-receiving resonator and the power-receiving coil.

An aspect of the present invention to achieve the above object is a method for forming a magnetic field space in a wireless power transmission apparatus configured to supply power from a power-supplying module comprising at least a power-supplying resonator to a power-receiving module comprising at least a power-receiving resonator, by means of a resonance phenomenon, wherein setting is carried out so that the transmission characteristic with respect to the power-source frequencies of the power, of the power-supplying resonator and the power-receiving resonator, has two peak bands; and a magnetic field space is formed between the power-supplying resonator and the power-receiving resonator, the magnetic field space having a magnetic field strength smaller than a magnetic field strength, by setting the power-source frequency of the power to be supplied to the power-supplying module to a power-source frequency band corresponding to any one of the two peak bands of the transmission characteristic.

In the above method, setting is carried out so that the transmission characteristic of the power-supplying resonator and the power-receiving resonator, at a time of wireless power transmission by means of a resonance phenomenon, has two peak bands, and a magnetic field space having a magnetic field strength smaller than a magnetic field strength around the power-supplying resonator and the power-receiving resonator, by setting the power-source frequency of the power to be supplied to the power-supplying module to a power-source frequency band corresponding to any one of the two peak bands of the transmission characteristic.

By accommodating electronic devices that should be kept away from effects of a magnetic field, in the magnetic field space with a reduced magnetic field strength as compared with the strength of the surrounding magnetic field, the chances of Eddy current occurring due to the magnetic field is reduced or prevented in those electronic devices, and keep the devices away from negative effects stemming from heat generation.

Advantageous Effects

The present invention provides a wireless power transmission apparatus capable of intentionally forming a magnetic field space between a power-supplying module and a power-receiving module, the magnetic field space having a small magnetic field strength, and further capable of controlling the size of the magnetic field space with a small magnetic field strength; and to provide a method of forming such a magnetic field space.

DESCRIPTION OF EMBODIMENTS

The following describes a wireless power transmission apparatus 1 of the present invention used for wireless power transmission, and a method of the present invention for forming a magnetic field space G1 or G2 in the wireless power transmission apparatus 1.

Embodiment

Figure 1:
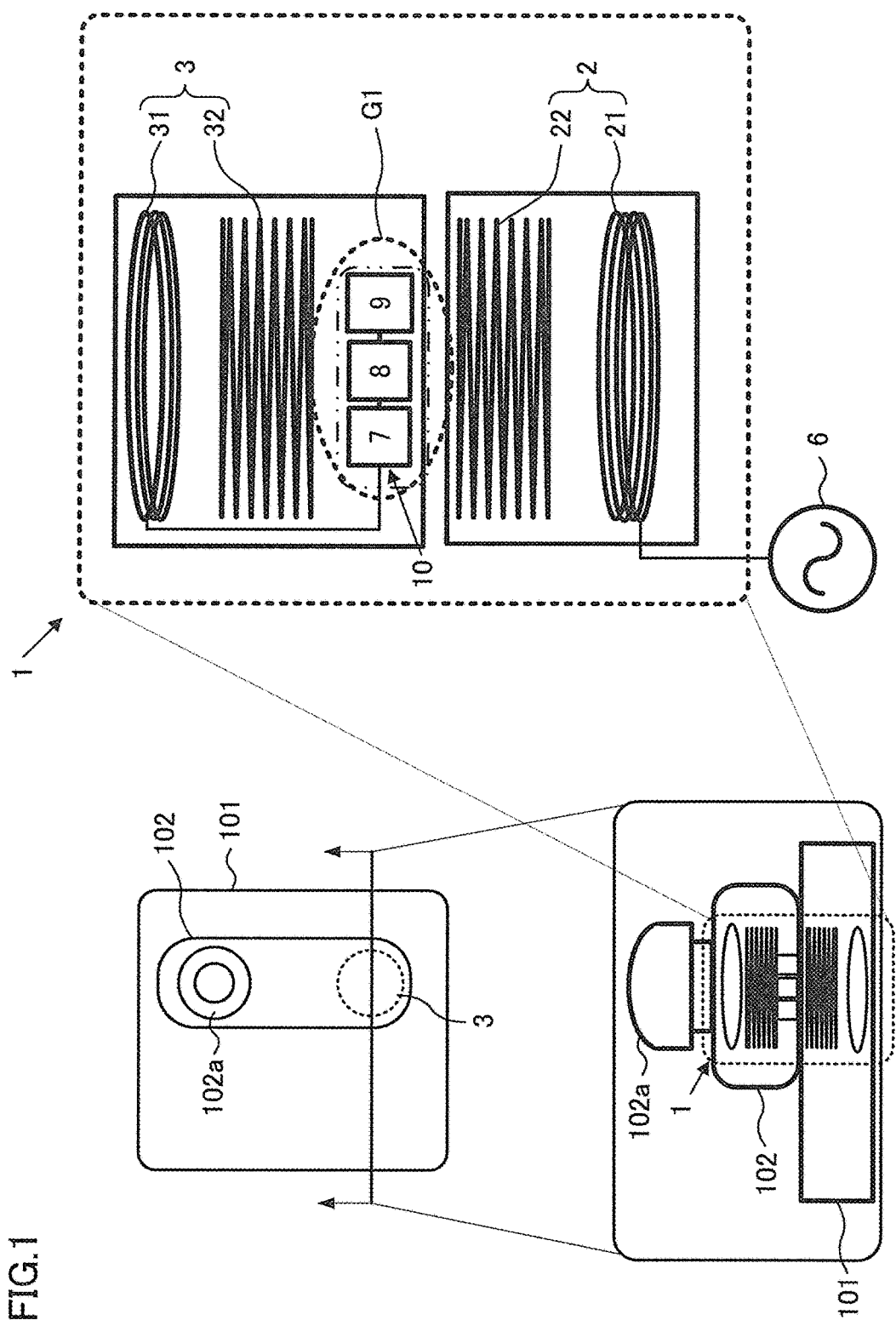
FIG. 1 is an explanatory diagram of a charger and an RF headset mounted in the wireless power transmission apparatus related to one embodiment.
Figure 2:
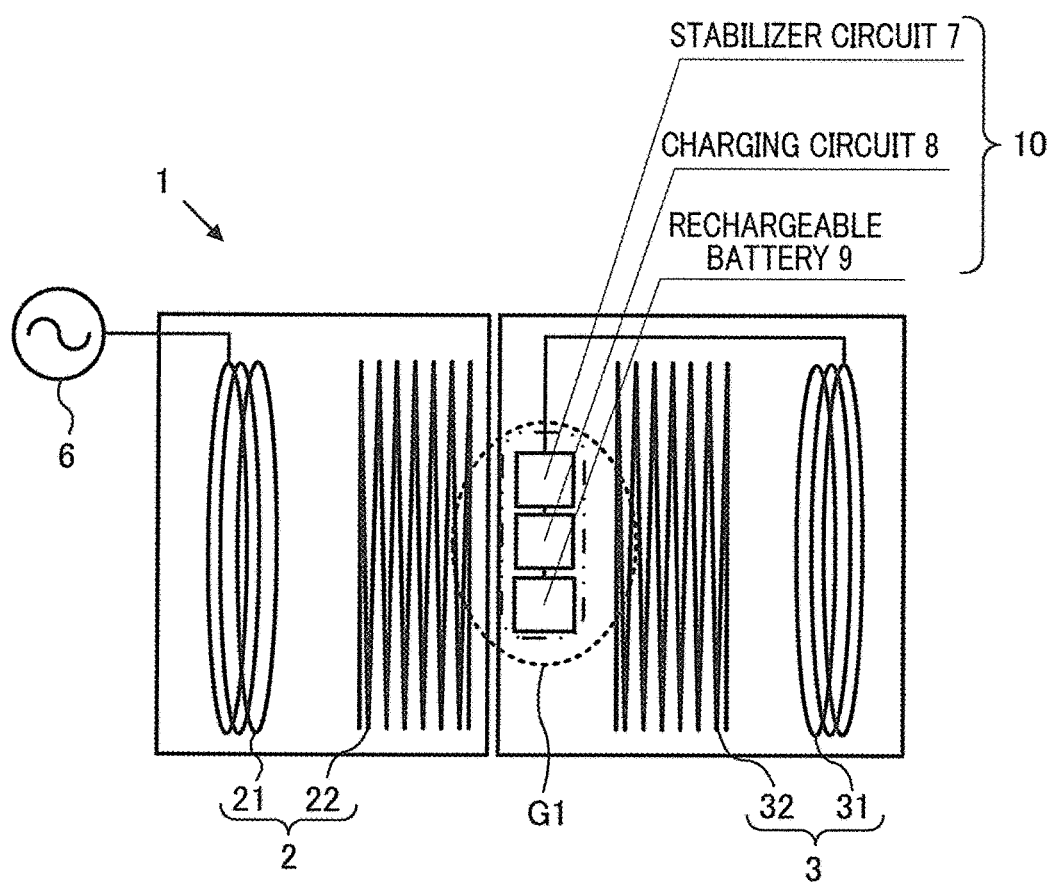
FIG. 2 is a structural diagram of the wireless power transmission apparatus related to the embodiment.

As shown in FIG. 1 and FIG. 2, the present embodiment describes a charger 101 having a power-supplying module 2 and an RF headset 102 having a power-receiving module 3 as an example of the wireless power transmission apparatus 1 essentially including a power-supplying module 2 including a power-supplying resonator 22 and a power-receiving module 3 including a power-receiving resonator 32, which apparatus is capable of forming a magnetic field space G1 (G2) whose magnetic field strength is smaller than the strength of the surrounding magnetic field. It should be noted that FIG. 1 shows the charger 101 and the RF headset 102 in the process of charging.

(Structures of Charger 101 and RF Headset 102)

As shown in FIG. 1 and FIG. 2, a charger 101 includes a power-supplying coil 21 and a power-supplying module 2 having a power-supplying resonator 22. A RF headset 102 includes an earphone speaker unit 102a, a power-receiving coil 31, and a power-receiving module 3 having a power-receiving resonator 32. The power-supplying coil 21 of the power-supplying module 2 is connected to an AC power source 6 having an oscillation circuit with the power-source frequency of the power to be supplied to the power-supplying module 2 to a predetermined value. The power-receiving coil 31 of the power-receiving module 3 is connected to a rechargeable battery 9 via a charging circuit 8 configured to prevent overcharge and a stabilizer circuit 7 configured to rectify the AC power received. At a time of charging, the stabilizer circuit 7, the charging circuit 8, and the rechargeable battery 9 are arranged in positions between the power-supplying resonator 22 and the power-receiving resonator 32. As detailed later, a magnetic field space G1 is formed between the power-supplying resonator 22 and the power-receiving resonator 32, the magnetic field space having a smaller magnetic field strength than the strength of the surrounding magnetic field, in which space the stabilizer circuit 7, the charging circuit 8, and the rechargeable battery 9 are positioned. It should be noted that, as shown in FIG. 1 and FIG. 2, the stabilizer circuit 7, the charging circuit 8, and the rechargeable battery 9 of the present embodiment are a device to be powered (hereinafter, referred to as target device) 10 which is the final destination of the supplied power. The target device 10 is a generic term for the entire device to which the supplied power is destined, which is connected to the power-receiving module 3. Further, the power-supplying module 2 and the power-receiving module 3 are the wireless power transmission apparatus 1.

Further, although illustration is omitted, the charger 101 is provided with an accommodation groove for accommodating and conforms to the shape of the RF headset 102. By accommodating the RF headset 102 to this groove, the RF headset 102 is positioned so that the power-supplying module 2 of the charger 101 and the power-receiving module 3 of the RF headset 102 face each other.

Figure 3:
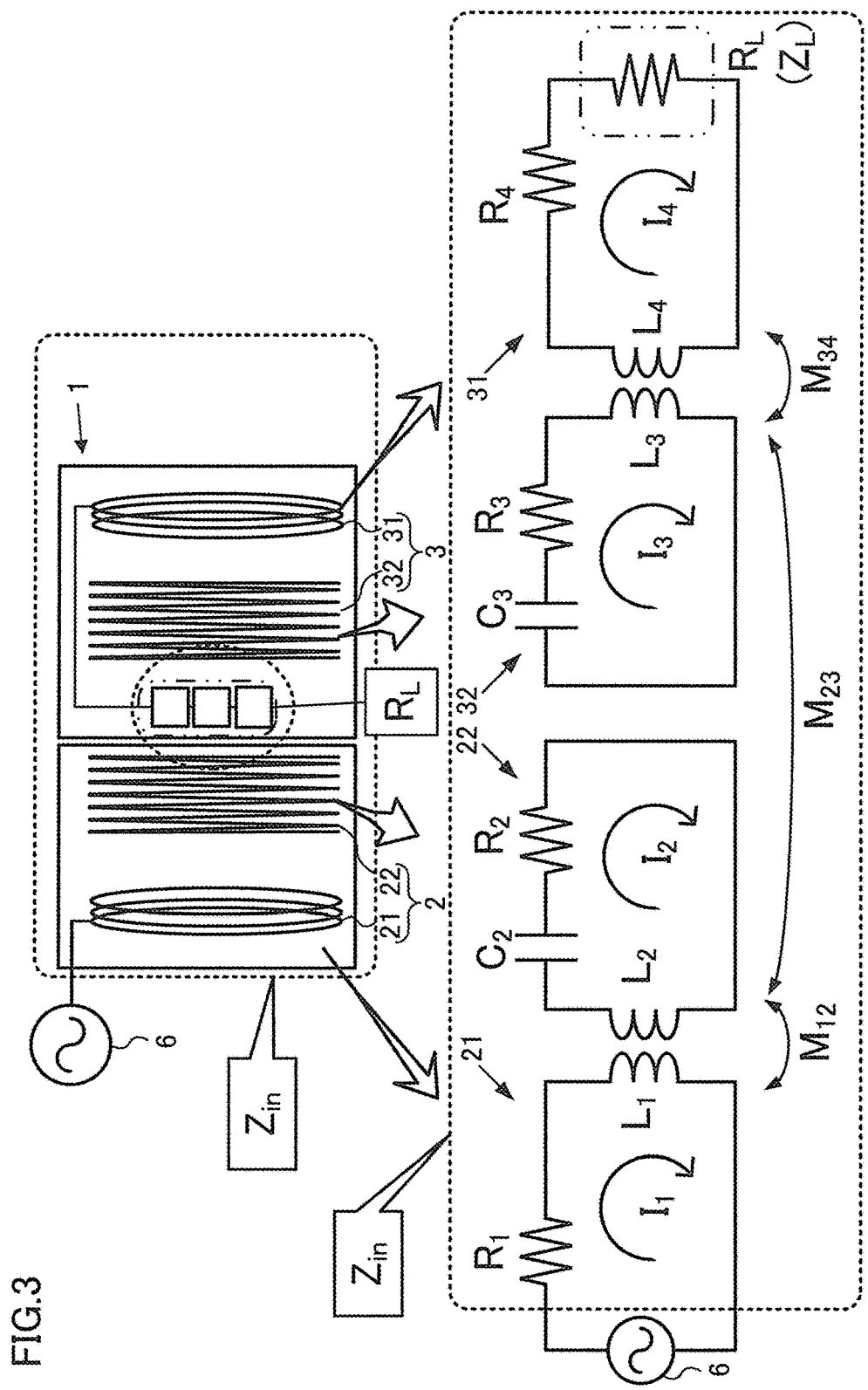
FIG. 3 is an explanatory diagram showing the wireless power transmission apparatus related to the embodiment, in the form of equivalent circuit.

The power-supplying coil 21 plays a role of supplying the power from an AC power source 6 to the power-supplying resonator 22 by means of electromagnetic induction. As shown in FIG. 3, the power-supplying coil 21 is constituted by an RL circuit whose elements include a resistor $R_1$ and a coil $L_1$. As the coil $L_1$ is adopted a solenoid coil. The total impedance of a circuit element constituting the power-supplying coil 21 is $Z_1$. In the present embodiment, the $Z_1$ is the total impedance of the RL circuit (circuit element) constituting the power-supplying coil 21, which includes the resistor $R_1$ and the coil $L_1$. Further, the current that flows in the power-supplying coil 21 is $I_1$.

The power-receiving coil 31 plays roles of receiving the power having been transmitted as a magnetic field energy from the power-supplying resonator 22 to the power-receiving resonator 32, by means of electromagnetic induction, and supplying the power received to the rechargeable battery 9 via the stabilizer circuit and the charging circuit 8. As shown in FIG. 3, the power-receiving coil 31, similarly to the power-supplying coil 21, is constituted by an RL circuit whose elements include a resistor $R_4$ and a coil $L_4$. As the coil $L_4$ is adopted a solenoid coil. The total impedance of a circuit element constituting the power-receiving coil 31 is $Z_4$. In the present embodiment, the $Z_4$ is the total impedance of the RL circuit (circuit element) constituting the power-receiving coil 31, which includes the resistor $R_4$ and the coil $L_4$. The total impedance of a target device 10 (the stabilizer circuit 7, the charging circuit 8, and the rechargeable battery 9) connected to the power-receiving coil 31 is $Z_L$. Further, the current that flows in the power-receiving coil 31 is $I_4$. It should be noted that, as shown in FIG. 3, the total load impedance of the target device 10 (the stabilizer circuit 7, the charging circuit 8, and the rechargeable battery 9) connected to the power-receiving coil 31 is referred to as a resister $R_L$ (corresponding to $Z_L$), for the sake of convenience.

As shown in FIG. 3, the power-supplying resonator 22 is constituted by an RLC circuit whose elements include a resistor $R_2$, a coil $L_2$, and a capacitor $C_2$. Further, as shown in FIG. 3, the power-receiving resonator 32 is constituted by an RLC circuit whose elements include a resistor $R_3$, a coil $L_3$, and a capacitor $C_3$. The power-supplying resonator 22 and the power-receiving resonator 32 each serves as a resonance circuit and plays a role of creating a magnetic field resonant state. The magnetic field resonant state (resonance phenomenon) here is a phenomenon in which two or more coils resonate with each other at a resonance frequency band. The total impedance of a circuit element constituting the power-supplying resonator 22 is $Z_2$. In the present embodiment, the $Z_2$ is the total impedance of the RLC circuit (circuit element) constituting the power-supplying resonator 22, which includes the resistor $R_2$, the coil $L_2$, and the capacitor $C_2$. The total impedance of a circuit element constituting the power-receiving resonator 32 is $Z_3$. In the present embodiment, the $Z_3$ is the total impedance of the RLC circuit (circuit element) constituting the power-receiving resonator 32, which includes the resistor $R_3$, the coil $L_3$, and the capacitor $C_3$. Further, the current that flows in the power-supplying resonator 22 is $I_2$, and the current that flows in the power-receiving resonator 32 is $I_3$.

In the RLC circuit which is the resonance circuit in each of the power-supplying resonator 22 and the power-receiving resonator 32, the resonance frequency is fo which is derived from (Formula 1) below, where the inductance is L and the capacity of capacitor is C.

[Equation 1]

$$f = \frac{1}{2\pi\sqrt{LC}} \quad \text{(Formula 1)}$$

Further, as the power-supplying resonator 22 and the power-receiving resonator 32 are used solenoid coils. The resonance frequency of the power-supplying resonator 22 and that of the power-receiving resonator 32 are matched with each other. The power-supplying resonator 22 and the power-receiving resonator 32 may be a spiral coil or a solenoid coil as long as it is a resonator using a coil.

Figure 5:
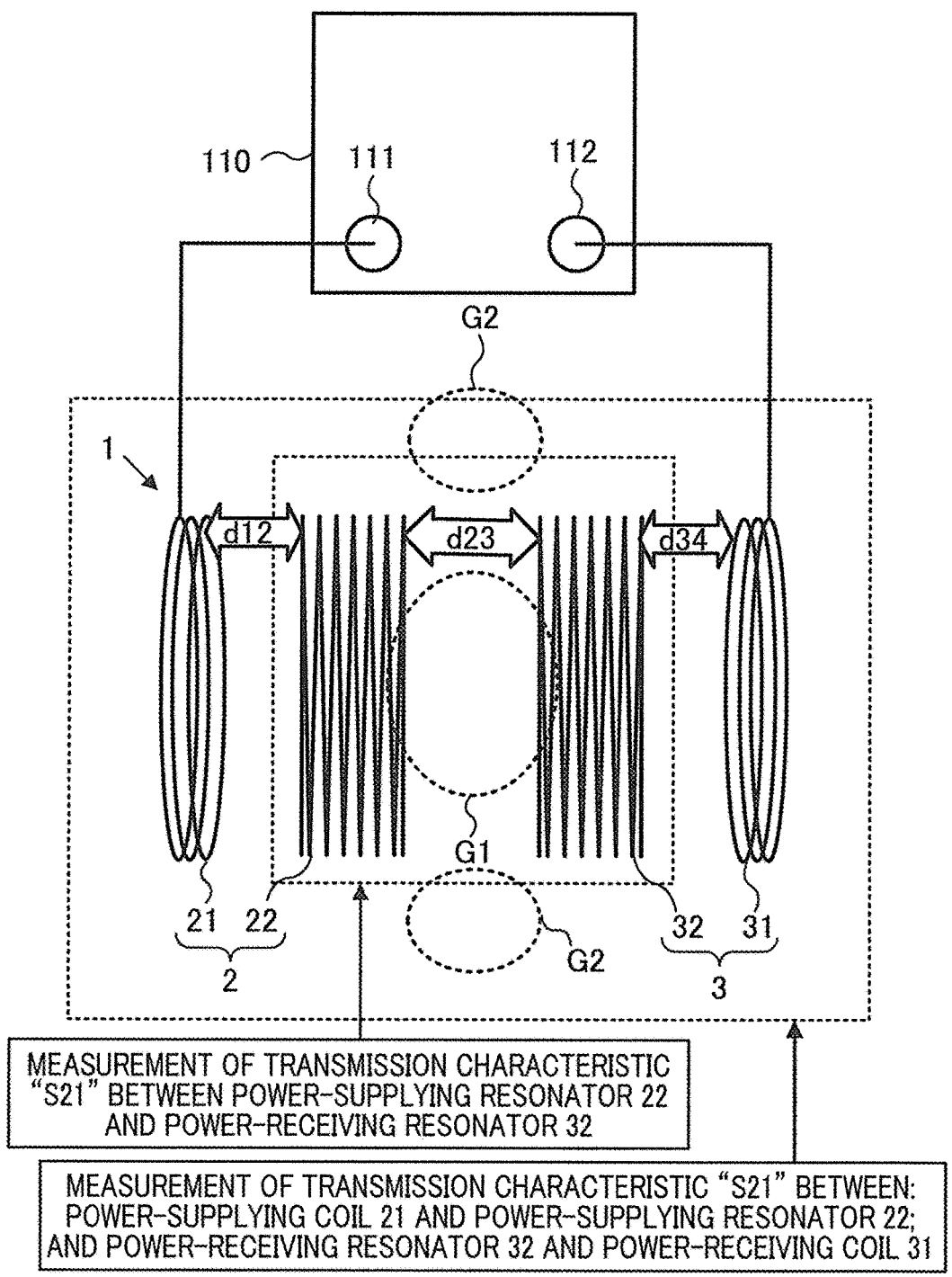
FIG. 5 is an explanatory diagram of a wireless power transmission apparatus connected to a network analyzer.

In regard to the above, the distance between the power-supplying coil 21 and the power-supplying resonator 22 is denoted as d12, the distance between the power-supplying resonator 22 and the power-receiving resonator 32 is denoted as d23, and the distance between the power-receiving resonator 32 and the power-receiving coil 31 is denoted as d34 (see FIG. 5).

Further, as shown in FIG. 2, a mutual inductance between the coil $L_1$ of the power-supplying coil 21 and the coil $L_2$ of the power-supplying resonator 22 is $M_{12}$, a mutual inductance between the coil $L_2$ of the power-supplying resonator 22 and the coil $L_3$ of the power-receiving resonator 32 is $M_{23}$, and a mutual inductance between the coil $L_3$ of the power-receiving resonator 32 and the coil $L_4$ of the power-receiving coil 31 is $M_{34}$. Further, in regard to the power-supplying module 2 and the power-receiving module 3, a coupling coefficient between the coil $L_1$ and the coil $L_2$ is denoted as $k_{12}$, a coupling coefficient between the coil $L_2$ and the coil $L_3$ is denoted as $k_{23}$, a coupling coefficient between the coil $L_3$ and the coil $L_4$ is denoted as $k_{34}$.

The above described wireless power transmission apparatus 1 (the power-supplying module 2 and the power-receiving module 3) enables magnetic field resonant state (resonance phenomenon) to occur between the power-supplying resonator 22 and the power-receiving resonator 32. When a magnetic field resonant state is created between the power-supplying resonator 22 and the power-receiving resonator 32 by having these resonators resonating with each other, power is transmitted from the power-supplying resonator 22 to the power-receiving resonator 32 as magnetic field energy. Therefore, the power is transmitted wirelessly from the charger 101 having the power-supplying module 2 to the RF headset 102 having the power-receiving module 3, and the rechargeable battery 9 in the wireless headset 102 is charged.

(Formation of Magnetic Field Space)

In the present embodiment, a magnetic field space G1 or G2 with weakened magnetic field strengths is formed to restrain the strength of the magnetic field occurring inside and around the power-supplying module 2 and the power-receiving module 3. Specifically as shown in FIG. 1 to FIG. 5, when the power is supplied from the power-supplying resonator 22 of the power-supplying module 2 to the power-receiving resonator 32 of the power-receiving module 3 by utilizing a resonance phenomenon, a magnetic field space G1 or G2 is formed nearby the power-supplying resonator 22 and the power-receiving resonator 32, the magnetic field space G1 or G2 having a smaller magnetic field strength than the strength of the surrounding magnetic field.

To form the magnetic field space G1 or G2, setting is carried out so that a graph showing the transmission characteristic "S21" with respect to the power-source frequency of the power-supplying resonator 22 and the power-receiving resonator 32 exhibits two peak bands, and the power-source frequency of the power to be supplied to the power-supplying module is set to a power-source frequency corresponding to any of the two peak bands. As shown in FIG. 1 to FIG. 5, in the present embodiment, the magnetic field space G1 is formed between the power-supplying resonator 22 and the power-receiving resonator 32 by setting the power-source frequency to a frequency corresponding to a peak band out of the two peak bands, on the high frequency side. It should be noted that, to form the magnetic field space G2 outside the power-supplying resonator 22 and the power-receiving resonator 32 (see FIG. 5), the power-source frequency is set to a frequency corresponding to a peak band out of the two peak bands, on the low frequency side.

The transmission characteristic "S21" is signals measured by a network analyzer 110 (e.g. E5061B produced by Agilent Technologies, Inc. and the like; see FIG. 5) connected to the wireless power transmission apparatus 1 (the power-supplying module 2 and the power-receiving module 3), and is indicated in decibel. The greater the value, it means the power transmission efficiency is high. Further, the power transmission efficiency means a ratio of the power output to the input terminal 112 for the power supplied from the output terminal 111 to the power-supplying module 2, while the wireless power transmission apparatus 1 is connected to the network analyzer 110.

Figure 4:
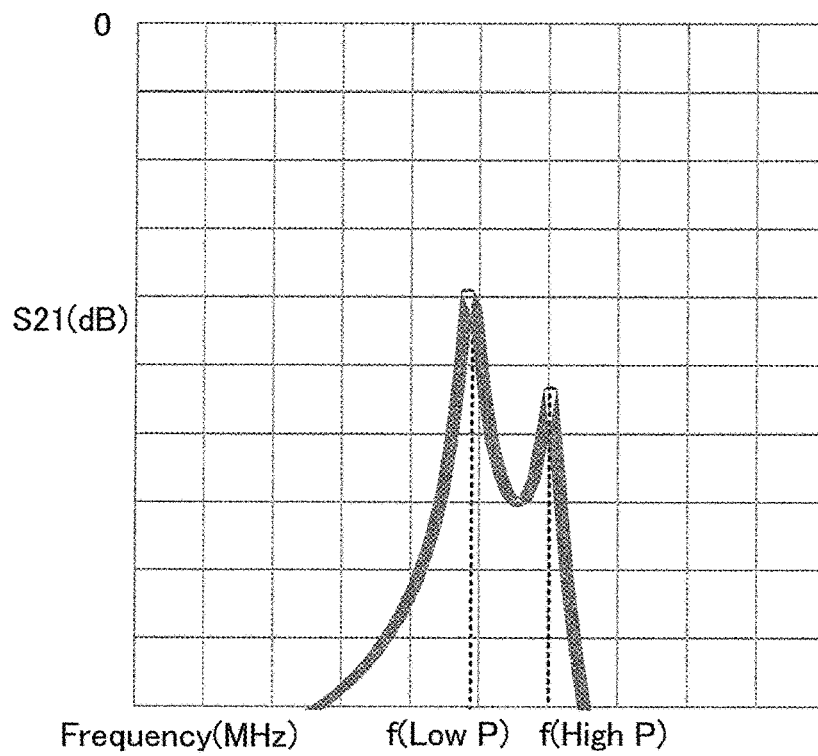
FIG. 4 is an explanatory diagram for a case where the transmission characteristic "S21" between resonators has two peaks.
Figure 4:
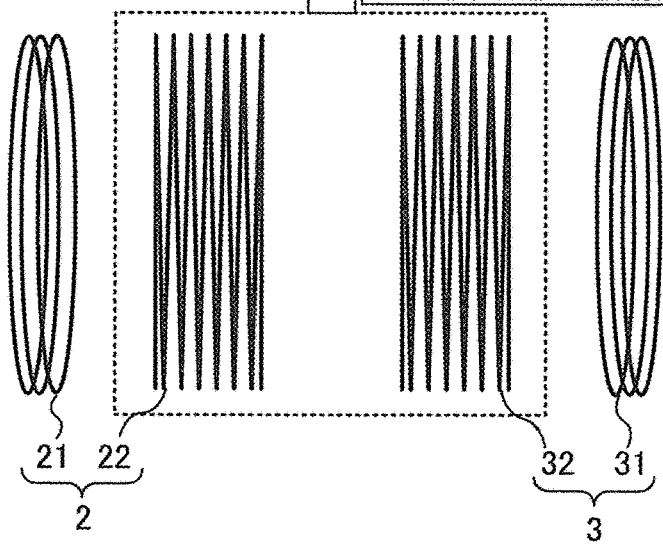

Specifically, as shown in FIG. 5, the transmission characteristic "S21" with respect to the power-source frequency, of the power-supplying resonator 22 and the power-receiving resonator 32 is analyzed by using the network analyzer 110, with various power-source frequencies to be supplied to the power-supplying resonator 22. In this regard, as shown in the graph of FIG. 4, the horizontal axis indicates the power-source frequencies of the AC power output from the output terminal 111, and the vertical axis indicates the transmission characteristic "S21". In measurement of the transmission characteristic "S21" of the power-supplying resonator 22 and the power-receiving resonator 32, if the coupling between the power-supplying coil 21 and the power-supplying resonator 22 is strong, the coupling state of the power-supplying resonator 22 and the power-receiving resonator is affected. Due to this, accurate measurement of the transmission characteristic "S21" of the power-supplying resonator 22 and the power-receiving resonator 32 is difficult. For this reason, the distance d12 between the power-supplying coil 21 and the power-supplying resonator 22 needs to be kept at a distance such that the power-supplying resonator 22 is sufficiently excited, a magnetic field by the power-supplying resonator 22 is generated, and coupling of the power-supplying coil 21 and the power-supplying resonator 22 with each other is prevented as much as possible. Further, for the similar reason, the distance d34 between the power-receiving resonator 32 and the power-receiving coil 31 needs to be kept at a distance such that the power-receiving resonator 32 is sufficiently excited, a magnetic field by the power-receiving resonator 32 is generated, and coupling of the power-receiving resonator 32 and the power-receiving coil 31 with each other is prevented as much as possible. Then, as shown in FIG. 4, setting is carried out so that an analysis-result waveform of the transmission characteristic "S21" of the power-supplying resonator 22 and the power-receiving resonator 32 has two peak bands which are a peak band (f(Low P)) occurring on the low frequency side and a peak band (f(High P)) occurring on the high frequency side.

To cause the analysis-result waveform of the transmission characteristic "S21" of the power-supplying resonator 22 and the power-receiving resonator 32 to have its peak split into two peak bands, one on the low frequency side and the other on the high frequency side, as hereinabove described, the distance d23 between the power-supplying resonator 22 and the power-receiving resonator 32 is adjusted, and/or variable parameters of the power-supplying resonator 22 and the power-receiving resonator 32 are adjusted. Examples of such parameters include resistance, inductance, and capacities of the $R_2$, $L_2$, $C_2$ of the RLC circuit of the power-supplying resonator 22 and $R_3$, $L_3$, $C_3$ of the RLC circuit of the power-receiving resonator 32, and a coupling coefficient $k_{23}$.

Figure 6:
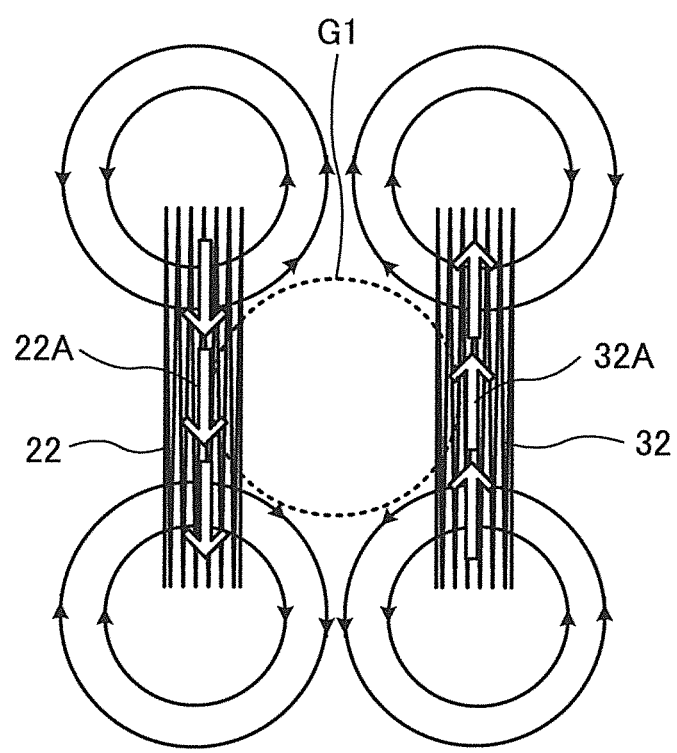
FIG. 6 is a magnetic field vector diagram in the antiphase resonance mode.

When the analysis-result waveform of the transmission characteristic "S21" of the power-supplying resonator 22 and the power-receiving resonator 32 has two peak bands, and when the power-source frequency of AC power to be supplied is set on the peak band (f(High P)) on the high frequency side, the power-supplying resonator 22 and the power-receiving resonator 32 resonate with each other in antiphase, and the direction (22A) of the current in the power-supplying resonator 22 and the direction (32A) of the current in the power-receiving resonator 32 are opposite to each other, as shown in FIG. 6. As a result, as the magnetic field vector diagram in FIG. 6 shows, because the magnetic field generated on the inner circumference side of the power-supplying resonator 22 and the magnetic field generated on the inner circumference side of the power-receiving resonator 32 cancel each other out, the magnetic field space G1 having a lower magnetic field strength than the magnetic field strengths in positions not on the inner circumference sides of the power-supplying resonator 22 and the power-receiving resonator 32 (e.g., the magnetic field strengths on the outer circumference sides of the power-supplying resonator 22 and the power-receiving resonator 32) is formed on the inner circumference sides of the power-supplying resonator 22 and the power-receiving resonator 32, as the effect of the magnetic fields is lowered. Note that the resonance state in which the current in the power-supplying resonator 22 and the current in the power-receiving resonator 32 flow in directions opposite to each other is referred to as antiphase resonance mode.

Figure 7:
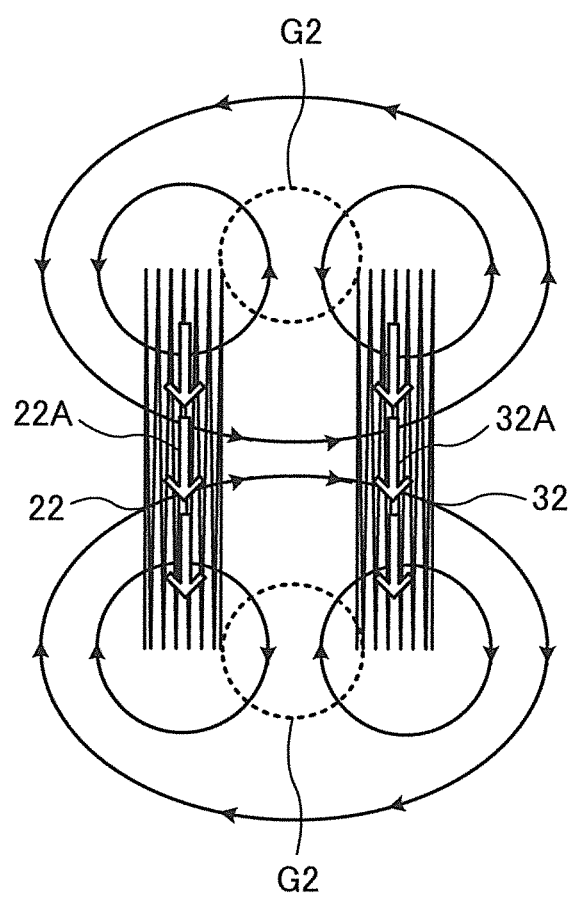
FIG. 7 is a magnetic field vector diagram in the inphase resonance mode.

On the other hand, when the analysis-result waveform of the transmission characteristic "S21" of the power-supplying resonator 22 and the power-receiving resonator 32 has two peak bands, and when the power-source frequency of AC power to be supplied is set on the peak band (f(Low P)) on the low frequency side, the power-supplying resonator 22 and the power-receiving resonator 32 resonate with each other in inphase, and the direction (22A) of the current in the power-supplying resonator 22 and the direction (32A) of the current in the power-receiving resonator 32 are the same, as shown in FIG. 7. As a result, as the magnetic field vector diagram in FIG. 7 shows, because the magnetic field generated on the outer circumference side of the power-supplying resonator 22 and the magnetic field generated on the outer circumference side of the power-receiving resonator 32 cancel each other out, the magnetic field space G2 having a lower magnetic field strength than the magnetic field strengths in positions not on the outer circumference sides of the power-supplying resonator 22 and the power-receiving resonator 32 (e.g., the magnetic field strengths on the inner circumference sides of the power-supplying resonator 22 and the power-receiving resonator 32) is formed on the inner circumference sides of the power-supplying resonator 22 and the power-receiving resonator 32, as the effects of the magnetic fields is lowered. Note that the resonance state in which the current in the power-supplying resonator 22 and the current in the power-receiving resonator 32 both flow in the same direction is referred to as inphase resonance mode.

(S21 of Power-Supplying Coil, Power-Supplying Resonator and Power-Receiving Resonator, and Power-Receiving Coil)

The above description dealt with formation of a magnetic field space, when the analysis-result waveform of the transmission characteristic "S21" of the power-supplying resonator 22 and the power-receiving resonator 32 has two peak bands. Next described is the magnetic field space G1 or G2 in a case where the power-supplying resonator 22 and the power-receiving resonator 32 are set so their transmission characteristic "S21" has two peak bands, and where an analysis-result waveform of the transmission characteristic "S21" of the power-supplying coil 21 and power-supplying resonator 22 and the power-receiving resonator 32 and the power-receiving coil 31 (i.e., the power-supplying module 2 and the power-receiving module 3) exhibits a single-hump characteristic or a double-hump characteristic.

Figure 8:
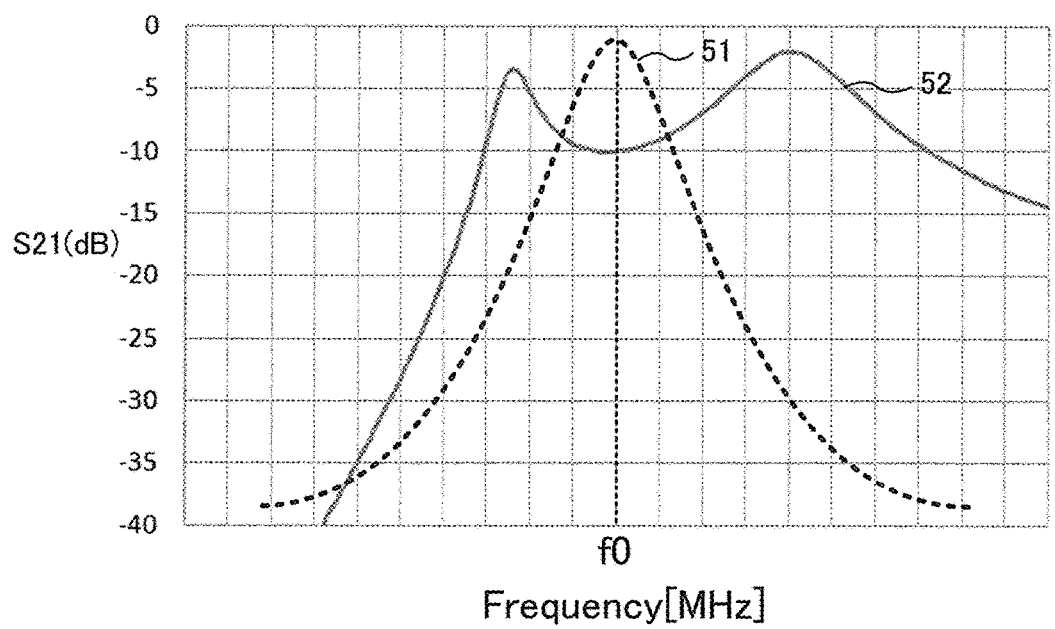
FIG. 8 is an explanatory diagram of single-hump and multiple-hump transmission characteristic "S21".

The transmission characteristic "S21" of the power-source frequency of the power to be supplied to the power-supplying coil 21 and the power-supplying resonator 22 and the power-receiving resonator 32 and the power-receiving coil 31 (i.e., the power-supplying module 2 and the power-receiving module 3) has a single-hump characteristic or a multiple-hump characteristic depending on the strength of the coupling by a magnetic field (magnetic coupling) between the coils. The single-hump characteristic means the analysis-result waveform of the transmission characteristic "S21" with respect to the power-source frequency of the power-supplying coil 21, the power-supplying resonator 22, the power-receiving resonator 32, and the power-receiving coil 31 has a single peak, and this peak occurs at the resonance frequency band (fo) (see dotted line 51 of FIG. 8). On the other hand, the multiple-hump characteristic means the analysis-result waveform of the transmission characteristic "S21" with respect to the power-source frequency of the power-supplying coil 21, the power-supplying resonator 22, the power-receiving resonator 32, and the power-receiving coil 31 has multiple peaks (two peaks in this example; see solid line 52 of FIG. 8). The multiple-hump characteristic, to be more specific, means that the reflection characteristic "S11" measured with the network analyzer 110 connected to the power-supplying module 2 and the power-receiving module 3 has at least two peaks, as shown in FIG. 5. Therefore, even if the transmission characteristic "S21" relative to the power-source frequency appears to have a single peak, the transmission characteristic "S21" has a multiple-hump characteristic if the reflection characteristic "S11" measured has two or more peaks.

For example, suppose the setting is such that the transmission characteristic "S21" of the power-supplying coil 21, the power-supplying resonator 22, the power-receiving resonator 32, and the power-receiving coil 31 has a single-hump characteristic. In this case, the transmission characteristic "S21" is maximized (the power transmission efficiency is maximized), when the power-source frequency is at the resonance frequency band fo, as shown by the dotted line 51 of FIG. 8.

On the other hand, suppose the setting is such that the transmission characteristic "S21" of the power-supplying coil 21, the power-supplying resonator 22, the power-receiving resonator 32, and the power-receiving coil 31 has a multiple-hump characteristic. In such a case, maximum values (a plurality of peak values) of the multiple-hump transmission characteristic "S21" are typically lower than the maximum value of the single-hump transmission characteristic "S21" (the value of the transmission characteristic "S21" at fo), if the distance between the power-supplying resonator 22 and the power-receiving resonator 32 is the same as that in the case of single-hump transmission characteristic "S21".

The single-hump or multiple-hump transmission characteristic "S21" of the power-supplying coil 21, the power-supplying resonator 22, the power-receiving resonator 32, and the power-receiving coil 31 is achieved by adjusting the variable parameters of the power-supplying module 2 and the power-receiving module 3 (i.e. wireless power transmission apparatus 1). These variable parameters include: the resistance, inductance, and capacity, that is, $R_1$ and $L_1$ of the RL circuit of the power-supplying coil 21 (in addition, $C_1$ in cases of adopting an RLC circuit), $R_2$, $L_2$, $C_2$ of the RLC circuit of the power-supplying resonator 22, $R_3$, $L_3$, $C_3$ of the RLC circuit of the power-receiving resonator 32, and $R_4$ and $L_4$ of the RL circuit of the power-receiving coil 31 (in addition, $C_4$ in cases of adopting an RLC circuit); the coupling coefficients $k_{12}$, $k_{23}$, $k_{34}$; inter coil distances d12, d23, d34; and the like.

(Measurement of Magnetic Field Space by Electromagnetic Analysis)

Next, the following explains formation of a magnetic field space G1 or G2 by means of measurement tests, in which the wireless power transmission apparatus 1 (the power-supplying module 2 and the power-receiving module 3) is connected to the network analyzer 110, as shown in FIG. 5. An electromagnetic field analysis was conducted to measure the magnetic field space G1 or G2, and the magnetic field strengths are expressed in different color tones.

It should be noted that the wireless power transmission apparatus 1 (the power-supplying module 2 and the power-receiving module 3) used in the measurement for the magnetic field space G1 or G2 is the same as the wireless power transmission apparatus 1 built into the charger 101 and the RF headset 102 except in that its scale is expanded for measurement. Specifically, in the wireless power transmission apparatus 1 used in the measurement tests, the power-supplying coil 21 is constituted by an RL circuit including a resistor $R_1$ and a coil $L_1$. The coil $L_1$ is a single-turn coil of 100 mm$\phi$ in its coil diameter, and is formed by a copper wire material (coated by an insulation film) of 1 mm$\phi$ in its wire diameter. Similarly to the power-supplying coil 21, the power-receiving coil 31 constitutes an RL circuit including a resistor $R_4$ and a coil $L_4$. The coil $L_4$ is a single-turn coil of 100 mm$\phi$ in its coil diameter, and is formed by a copper wire material (coated by an insulation film) of 1 mm$\phi$ in its wire diameter. Further, the power-supplying resonator 22 is constituted by an RLC circuit including a resistor $R_2$, a coil $L_2$, and a capacitor $C_2$. The coil $L_2$ adopts a 2-turn solenoid coil of 100 mm$\phi$ in its coil diameter, and is formed by a copper wire material (coated by an insulation film) of 1 mm$\phi$ in its wire diameter. Further, the power-receiving resonator 32 is constituted by an RLC circuit including a resistor $R_3$, a coil $L_3$, and a capacitor $C_3$. The coil $L_3$ adopts a 2-turn solenoid coil of 100 mmϕ in its coil diameter, and is formed by a copper wire material (coated by an insulation film) of 1 mmϕ in its wire diameter. The resonance frequency of the power-supplying resonator 22 and the power-receiving resonator 32 is 12.63 MHz. Further, the measurement was conducted with the distance d23 between the power-supplying resonator 22 and the power-receiving resonator 32 set to 120 mm, and the distance d12 between the power-supplying coil 21 and the power-supplying resonator 22 and the distance d34 between the power-receiving coil 31 and the power-receiving resonator 32 were adjusted according to the measurement conditions.

(Single-Hump Characteristic)

First, the transmission characteristic "S21" of the power-supplying resonator 22 and the power-receiving resonator 32 is analyzed by using the network analyzer 110, with various power-source frequency of AC power to be supplied. In this regard, as shown in the graph of FIG. 9, the horizontal axis indicates the power-source frequencies of the AC power, and the vertical axis indicates the transmission characteristic "S21".

Figure 9:
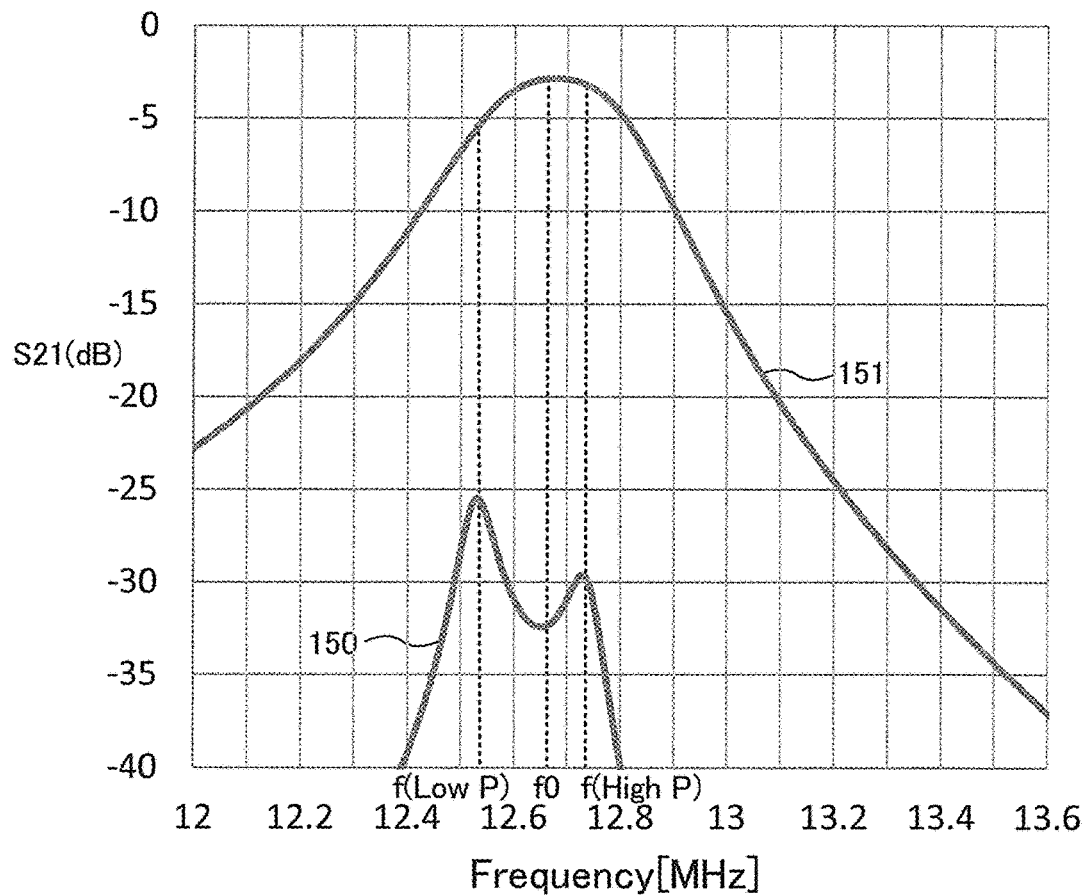
FIG. 9 is a graph indicating a relation of the transmission characteristic "S21" to a power-source frequency in cases of a single-hump characteristic.

As indicated by the solid line 150 of FIG. 9, the transmission characteristic "S21" of the power-supplying resonator 22 and the power-receiving resonator 32 had the peak band (f(Low P)) of the low frequency side at 12.53 MHz, and the peak band (f(High P)) of the high frequency side at 12.73 MHz. As should be seen, the transmission characteristic "S21" of the power-supplying resonator 22 and the power-receiving resonator 32 had two peak bands. It should be noted that the distance d23 between the power-supplying resonator 22 and the power-receiving resonator 32 of the wireless power transmission apparatus 1 was set to 120 mm in the measurement of the transmission characteristic "S21" of the power-supplying resonator 22 and the power-receiving resonator 32. Meanwhile, the distance d12 between the power-supplying coil 21 and the power-supplying resonator 22 was set to 100 mm. This way, the power-supplying resonator 22 is sufficiently excited, a magnetic field is generated by the power-supplying resonator 22, and the power-supplying coil 21 and the power-supplying resonator 22 are spaced from each other so as not be coupled with each other. Similarly, the distance d34 between the power-receiving resonator 32 and the power-receiving coil 31 was set to 100 mm. This way, the power-receiving resonator 32 is sufficiently excited, a magnetic field is generated by the power-receiving resonator 32 and the power-receiving coil 31 are spaced from each other so as not be coupled with each other.

Further, the setting is such that the analysis-result waveform exhibits a single-hump characteristic with its peak nearby 12.6 MHz, as is seen in FIG. 9, in the transmission characteristic "S21" of the power-supplying coil 21 and the power-supplying resonator 22 and the power-receiving resonator 32 and the power-receiving coil 31 (i.e., the power-supplying module 2 and the power-receiving module 3) (solid line 151 of FIG. 9). This peak occurs nearby the resonance frequency fo (12.63 MHz) of the power-supplying resonator 22 and the power-receiving resonator 32. It should be noted that, to conduct a measurement with a single-hump transmission characteristic "S21" of the power-supplying coil 21 and the power-supplying resonator 22 and the power-receiving resonator 32 and the power-receiving coil 31 (i.e., the power-supplying module 2 and the power-receiving module 3), the distance d23 between the power-supplying resonator 22 and the power-receiving resonator 32 was set to 120 mm, the distance d12 between the power-supplying coil 21 and the power-supplying resonator 22 was set to 20 mm, and the distance d34 between the power-receiving resonator 32 and the power-receiving coil 31 was set to 20 mm, in the above wireless power transmission apparatus 1.

Next, the power-source frequency of AC power to be supplied to the power-supplying module 2 of the above wireless power transmission apparatus 1 was set to 12.5 MHz (f(Low P)) and 12.7 MHz (f(High P)), and distribution of the magnetic field strengths around the power-supplying resonator 22 and the power-receiving resonator 32 was analyzed by means of electromagnetic analysis. The magnetic field strengths are indicated in different color tones and shown as analysis results in FIG. 10.

Figure 10:
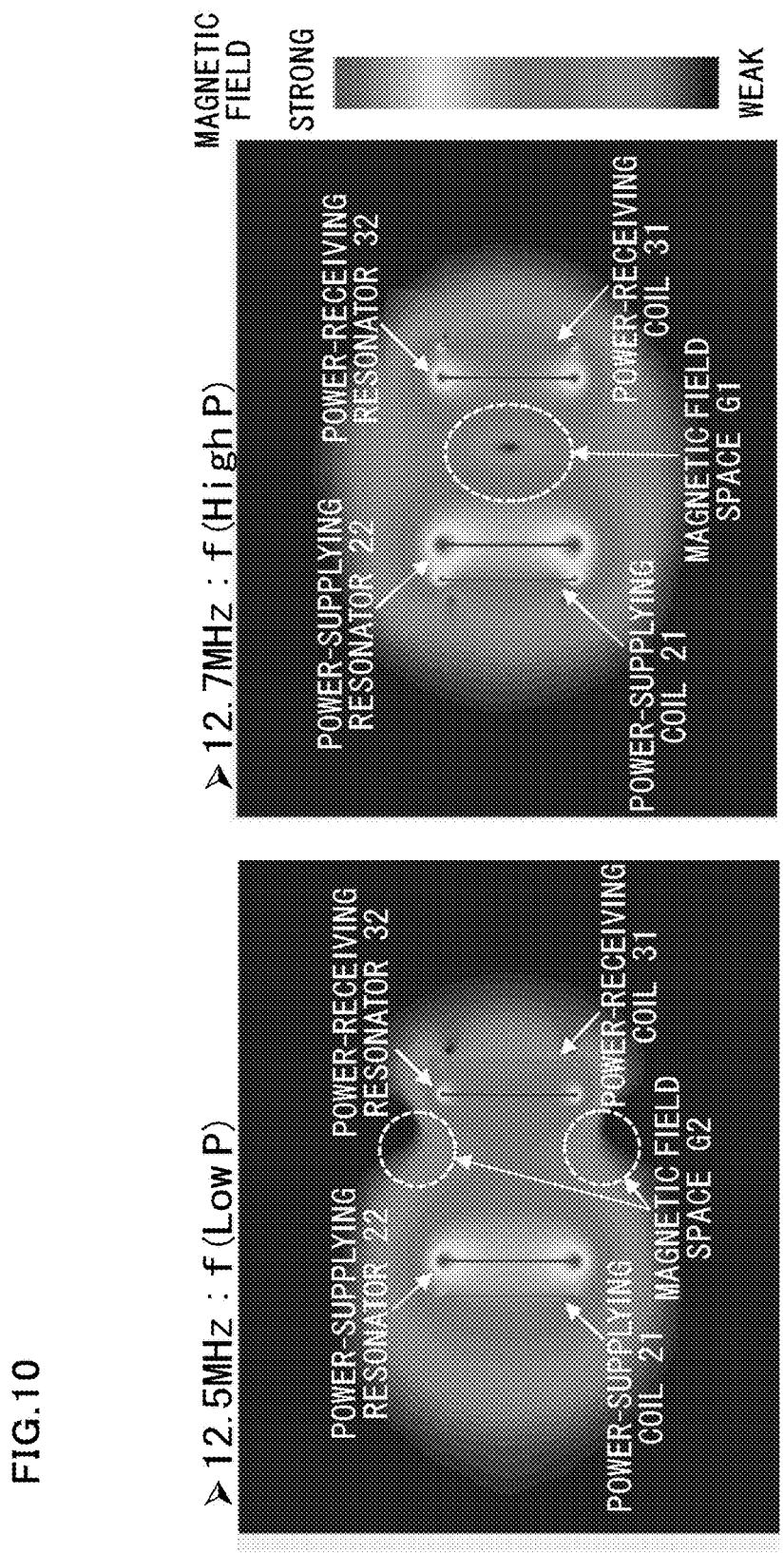
FIG. 10 is a diagram showing distribution of magnetic field strength in cases of a single-hump characteristic, which is measured by using an electromagnetic analyzer.

From this distribution of magnetic field strengths shown in FIG. 10, in the case of 12.5 MHz (f(Low P)), a magnetic field space G2 was confirmed outside the power-supplying resonator 22 and the power-receiving resonator 32, the magnetic field space G2 having a smaller magnetic field strength than the surrounding magnetic field strength, and less affected by magnetic fields (The magnetic field strength of the magnetic field space G2 was also relatively smaller as compared with the strength of the magnetic field outside the power-supplying resonator 22 and the power-receiving resonator 32, in the case of 12.7 MHz (f(High P)) shown in FIG. 10). Further, in the case of 12.7 MHz, a magnetic field space G1 with a smaller magnetic field strength than the surrounding magnetic field strength, which is less affected by magnetic fields was confirmed between the power-supplying resonator 22 and the power-receiving resonator 32 (The magnetic field strength of the magnetic field space G1 was also relatively smaller as compared with the strength of the magnetic field between the power-supplying resonator 22 and the power-receiving resonator 32, in the case of 12.5 MHz (f(Low P)) shown in FIG. 10).

From the above, the following is understood. Suppose the transmission characteristic "S21" of the power-supplying coil 21, the power-supplying resonator 22, the power-receiving resonator 32, and the power-receiving coil 31 has a single-hump characteristic. Even in such a case, it is possible to form a magnetic field space G1 between the power-supplying resonator 22 and the power-receiving resonator 32, the magnetic field strength G1 having a smaller magnetic field strength than the surrounding magnetic field strength, and less affected by a magnetic field. To do so, setting is carried out so that the transmission characteristic "S21" of the power-supplying resonator 22 and the power-receiving resonator 32 has two peak bands, and the power-source frequency is set to one that corresponds to the peak band (f(High P)) on the high frequency side, out of the two peak bands. Further, by setting the power-source frequency to one that corresponds to the peak band (f(Low P)) formed on the low frequency side of the two peak bands of the transmission characteristic "S21", it is possible to form the magnetic field space G2 outside the power-supplying resonator 22 and the power-receiving resonator 32, the magnetic field space G2 having a smaller magnetic field strength than the strength of the surrounding magnetic field and less affected by the magnetic field.

(Effect to Transmission Characteristic "S21" in Magnetic Field Space G1 or G2: Verification with Iron or Copper Piece)

The following verification took place where the transmission characteristic "S21" of the power-supplying coil 21, the power-supplying resonator 22, the power-receiving resonator 32, and the power-receiving coil 31 had a single-hump characteristic. Electronic devices such as a stabilizer circuit 7, a charging circuit 8, and a rechargeable battery 9 were arranged between or outside the power-supplying resonator 22 and the power-receiving resonator 32. Then, study was conducted whether or not this arrangement of electronic devices affected the transmission characteristic "S21" of the power-supplying coil 21, the power-supplying resonator 22, the power-receiving resonator 32, and the power-receiving coil 31 (wireless power transmission apparatus 1), i.e., the power transmission efficiency of the wireless power transmission apparatus.

(Iron Piece Inserted Between Power-Supplying Resonator 22 and Power-Receiving Resonator 32: Single-Hump Characteristic)

Figure 11:
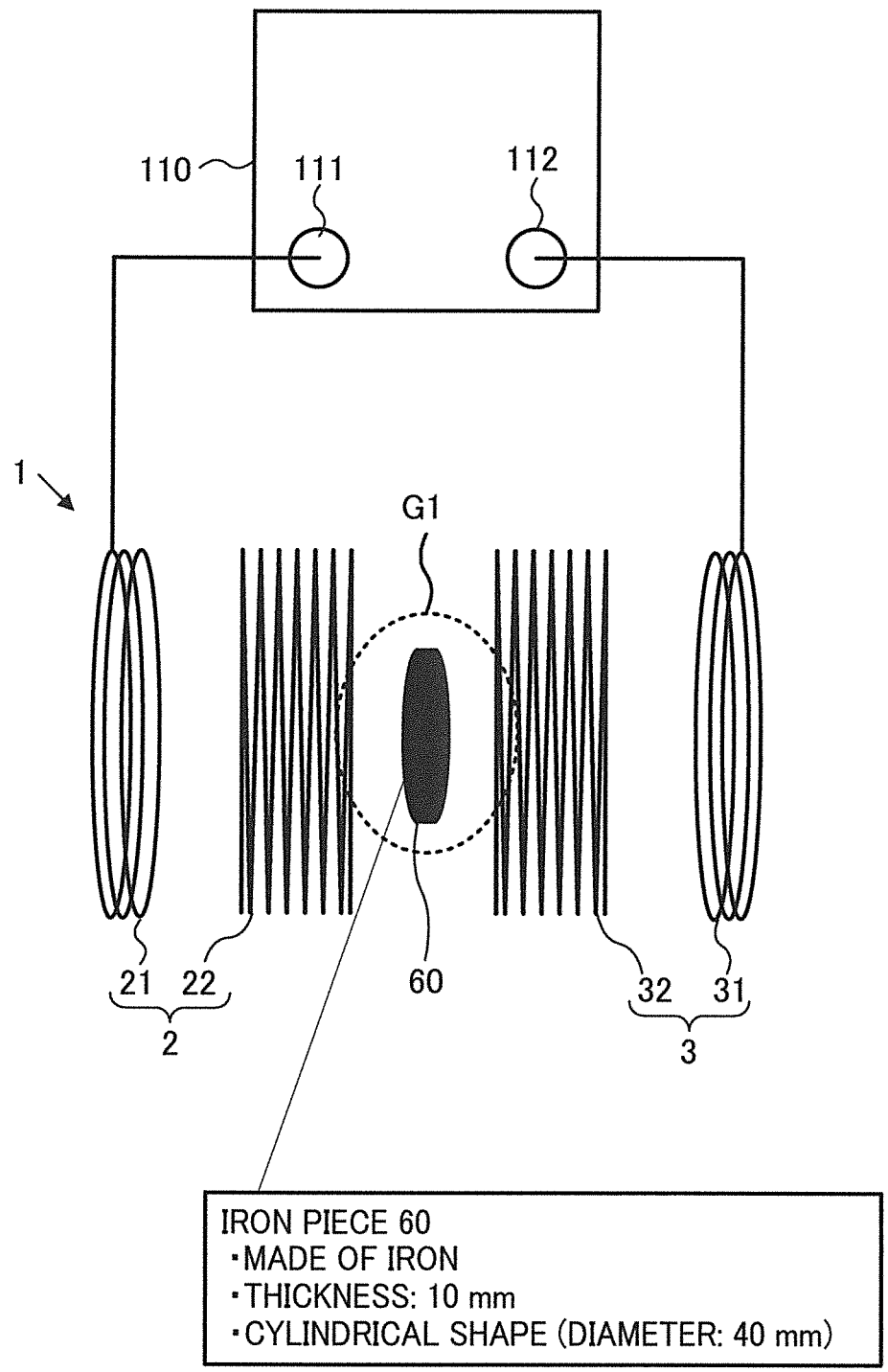
FIG. 11 is an explanatory diagram of a wireless power transmission apparatus used at a time of analyzing transmission characteristic "S21" in the magnetic field space G1.

Assuming that an iron piece 60 as the electronic devices such as a stabilizer circuit 7, a charging circuit 8, and a rechargeable battery 9, the iron piece 60 was inserted between the power-supplying resonator 22 and the power-receiving resonator 32. Then, effects of the iron piece 60 was verified through measurement of the transmission characteristic "S21" of the power-supplying coil 21, the power-supplying resonator 22, the power-receiving resonator 32, and the power-receiving coil 31 (see FIG. 11). As the iron piece 60 is used a cylindrical iron piece of 10 mm in thickness and 40 mm in diameter, as shown in FIG. 11.

While the iron piece 60 was inserted between the power-supplying resonator 22 and the power-receiving resonator 32, the transmission characteristic "S21" of the power-supplying coil 21, the power-supplying resonator 22, the power-receiving resonator 32, and the power-receiving coil 31 was analyzed while varying the power-source frequency of AC power supplied to power-supplying module 2. The following will describe, in combination, the transmission characteristic "S21" of the power-supplying coil 21, the power-supplying resonator 22, the power-receiving resonator 32, and the power-receiving coil 31, without the iron piece 60 inserted between the power-supplying resonator 22 and the power-receiving resonator 32 (see solid line 151 of FIG. 12).

Figure 12:
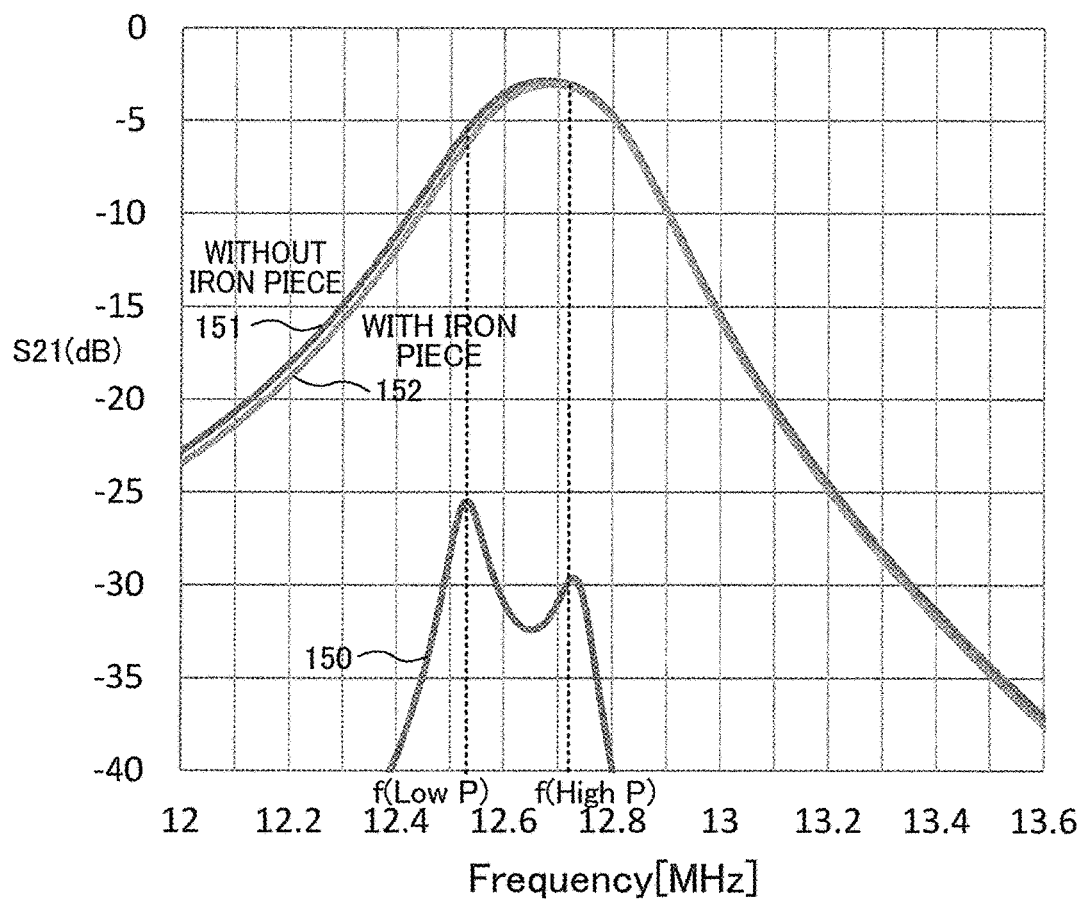
FIG. 12 is a graph indicating a relation of the transmission characteristic "S21" with respect to a power-source frequency, when an iron piece is inserted (single-hump characteristic).

In relation to the wireless power transmission apparatus 1, the analysis-result waveform of the transmission characteristic "S21" in the case of having the iron piece 60 inserted between the power-supplying resonator 22 and the power-receiving resonator 32 (solid line 152 of FIG. 12) and the analysis-result waveform of the transmission characteristic "S21" in the case of not inserting iron piece 60 between the power-supplying resonator 22 and the power-receiving resonator 32 (solid line 151 of FIG. 12) were compared with each other. While the transmission characteristic "S21" shown by the solid line 151 (without iron piece 60) was −5.4 dB at 12.53 MHz (f(Low P)), the transmission characteristic "S21" indicated by the solid line 152 (with iron piece 60) was −6.2 dB at 12.53 MHz (f(Low P)), as shown in FIG. 12. This indicates that, while the power-source frequency was set to 12.53 MHz (f(Low P)), the transmission characteristic "S21" dropped by 0.8 dB and the power transmission efficiency of the wireless power transmission apparatus 1 was affected, by insertion of the iron piece 60 between the power-supplying resonator 22 and the power-receiving resonator 32.

Meanwhile, the transmission characteristic "S21" indicated by the solid line 151 (without iron piece 60) was −3.1 dB at the 12.73 MHz (f(High P)) and the transmission characteristic "S21" indicated by the solid line 152 (with iron piece) was −3.2 dB at the 12.73 MHz (f(High P)). This indicates that, while the power-source frequency was set to 12.73 MHz (f(High P)), the transmission characteristic "S21" dropped only by 0.1 dB, and the power transmission efficiency of the wireless power transmission apparatus 1 was hardly affected, even when the iron piece 60 was inserted between the power-supplying resonator 22 and the power-receiving resonator 32.

In other words, it is understood as follows. When the power-source frequency was 12.53 MHz (f(Low P)), there was no magnetic field space G1 formed between the power-supplying resonator 22 and the power-receiving resonator 32, as shown in FIG. 10. Therefore, due to the effects from the iron piece 60, the transmission characteristic "S21" dropped, consequently affecting the power transmission efficiency of the wireless power transmission apparatus 1. Meanwhile, when the power-source frequency was 12.73 MHz (f(High P)), the magnetic field space G1 was formed between the power-supplying resonator 22 and the power-receiving resonator 32, as shown in FIG. 10. Since the iron piece 60 was in the magnetic field space G1, the transmission characteristic "S21" was hardly affected by the iron piece 60 and did not drop, and the power transmission efficiency of the wireless power transmission apparatus 1 was hardly affected.

(Copper Piece Arranged Outside Power-Supplying Resonator 22 and Power-Receiving Resonator 32: Single-Hump Characteristic)

Figure 13:
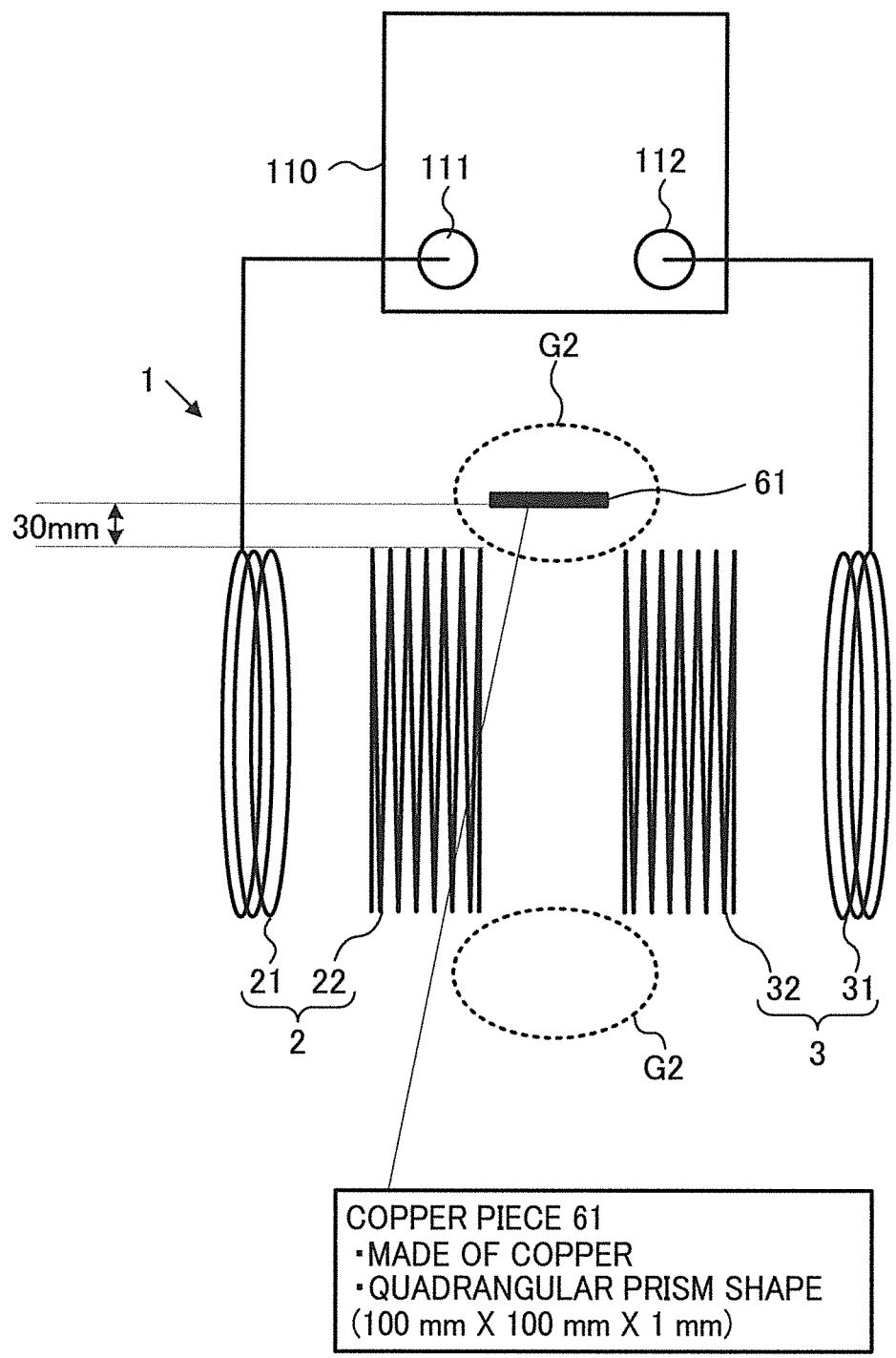
FIG. 13 is an explanatory diagram of a wireless power transmission apparatus used at a time of analyzing transmission characteristic "S21" in the magnetic field space G2.

Assuming that a copper piece 61 as the electronic devices such as a stabilizer circuit 7, a charging circuit 8, and a rechargeable battery 9, the copper piece 61 was arranged outside the power-supplying resonator 22 and the power-receiving resonator 32. Then, effects of the copper piece 61 was verified through measurement of the transmission characteristic "S21" of the power-supplying coil 21, the power-supplying resonator 22, the power-receiving resonator 32, and the power-receiving coil 31 (wireless power transmission apparatus 1) (see FIG. 13). As the copper piece 61 is used a copper piece having a shape of a quadrangular prism of 100 mm×100 mm×1 mm, as shown in FIG. 13. Further, the copper piece 61 is positioned 30 mm away from the power-supplying resonator 22 and the power-receiving resonator 32, as shown in FIG. 13.

While the copper piece 61 was arranged outside the power-supplying resonator 22 and the power-receiving resonator 32, the transmission characteristic "S21" of the power-supplying coil 21, the power-supplying resonator 22, the power-receiving resonator 32, and the power-receiving coil 31 was analyzed while varying the power-source frequency of AC power supplied to power-supplying module 2. The following will describe, in combination, the transmission characteristic "S21" of the power-supplying coil 21, the power-supplying resonator 22, the power-receiving resonator 32, and the power-receiving coil 31, without the copper piece 61 arranged outside the power-supplying resonator 22 and the power-receiving resonator 32 (see solid line 151 of FIG. 14).

Figure 14:
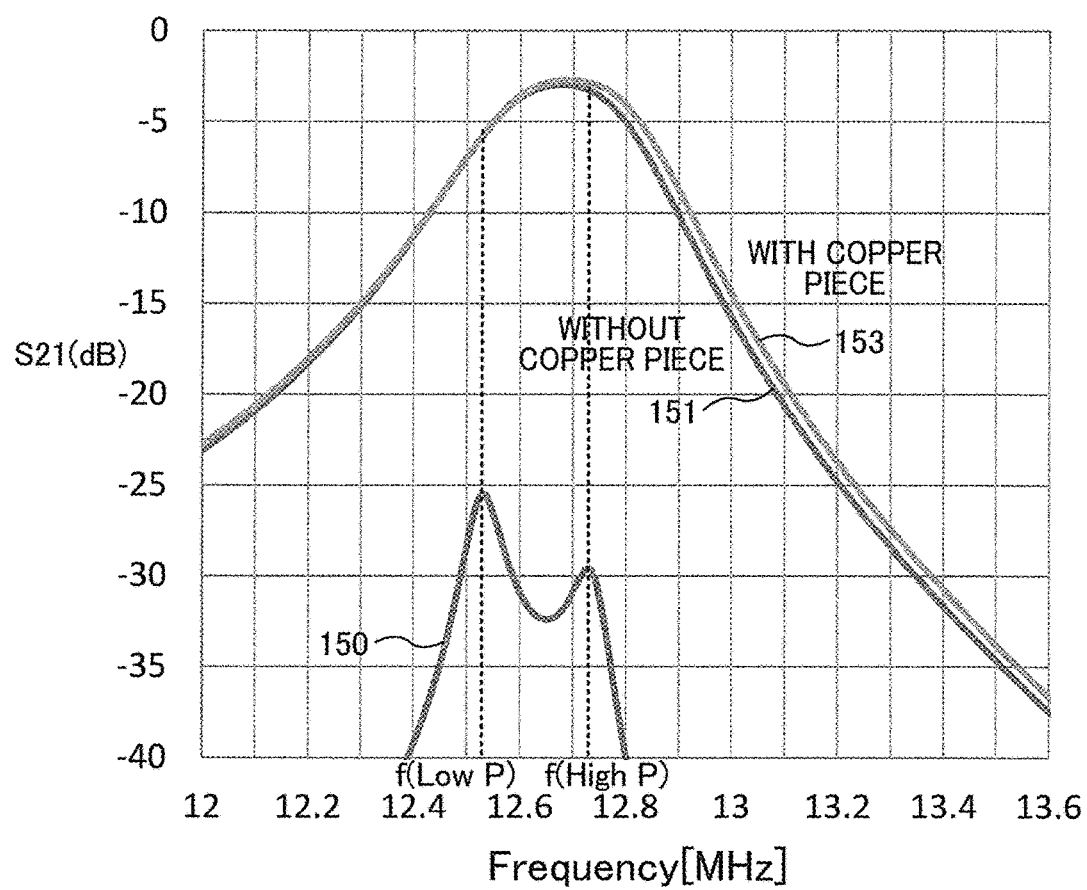
FIG. 14 is a graph indicating a relation of the transmission characteristic "S21" with respect to a power-source frequency, when a copper piece is inserted (single-hump characteristic).

In relation to the wireless power transmission apparatus 1, the analysis-result waveform of the transmission characteristic "S21" in the case of having the copper piece 61 arranged outside the power-supplying resonator 22 and the power-receiving resonator 32 (solid line 153 of FIG. 14) and the analysis-result waveform of the transmission characteristic "S21" in the case of arranging no copper piece 61 outside the power-supplying resonator 22 and the power-receiving resonator 32 (solid line 151 of FIG. 14) were compared with each other. While the transmission characteristic "S21" shown by the solid line 151 (without copper piece 61) was −3.1 dB at 12.73 MHz (f(High P)), the transmission characteristic "S21" indicated by the solid line 153 (with copper piece 61) was −2.5 dB at 12.73 MHz (f(High P)), as shown in FIG. 14. This indicates that, while the power-source frequency was set to 12.73 MHz (f(High P)), the transmission characteristic "S21" rose by 0.6 dB and the power transmission efficiency of the wireless power transmission apparatus 1 was affected, by arranging the copper piece 61 outside the power-supplying resonator 22 and the power-receiving resonator 32.

Meanwhile, the transmission characteristic "S21" indicated by the solid line 151 (without copper piece 61) was −5.4 dB at the 12.53 MHz (f(Low P)) and the transmission characteristic "S21" indicated by the solid line 153 (with copper piece 61) was −5.5 dB at the 12.53 MHz (f(Low P)). This indicates that, while the power-source frequency was set to 12.53 MHz (f(Low P)), the transmission characteristic "S21" dropped only by 0.1 dB, and the power transmission efficiency of the wireless power transmission apparatus 1 was hardly affected, even when the copper piece 61 was inserted between the power-supplying resonator 22 and the power-receiving resonator 32.

In other words, it is understood as follows. When the power-source frequency was 12.73 MHz (f(High P)), there was no magnetic field space G2 formed between the power-supplying resonator 22 and the power-receiving resonator 32, as shown in FIG. 10. Therefore, due to the effects from the copper piece 61, the transmission characteristic "S21" rose, consequently affecting the power transmission efficiency of the wireless power transmission apparatus 1. Meanwhile, when the power-source frequency was 12.53 MHz (f(Low P)), the magnetic field space G2 was formed between the power-supplying resonator 22 and the power-receiving resonator 32, as shown in FIG. 10. Since the copper piece 61 was in the magnetic field space G2, the transmission characteristic "S21" was hardly affected by the iron piece 61 and did not rise, and the power transmission efficiency of the wireless power transmission apparatus 1 was hardly affected.

In conclusion, it is understood that the transmission characteristic "S21" of the power-supplying coil 21, the power-supplying resonator 22, the power-receiving resonator 32, and the power-receiving coil 31 (wireless power transmission apparatus 1), i.e., the power transmission efficiency of the wireless power transmission apparatus 1 is hardly affected, when a magnetic field space G1 is formed between the power-supplying resonator 22 and power-receiving resonator 32 and when electronic devices such as the stabilizer circuit 7, the charging circuit 8, and the rechargeable battery 9 are arranged in that magnetic field space G1. Similarly, it is understood that the transmission characteristic "S21" of the power-supplying coil 21, the power-supplying resonator 22, the power-receiving resonator 32, and the power-receiving coil 31 (wireless power transmission apparatus 1), i.e., the power transmission efficiency of the wireless power transmission apparatus 1 is hardly affected, when a magnetic field space G2 is formed outside the power-supplying resonator 22 and power-receiving resonator 32 and when electronic devices such as the stabilizer circuit 7, the charging circuit 8, and the rechargeable battery 9 are arranged in that magnetic field space G2.

(Multiple-Hump Characteristic)

In the above described is the magnetic field space G1 or G2 in a case where the power-supplying resonator 22 and the power-receiving resonator 32 are set so their transmission characteristic "S21" has two peak bands, and where the transmission characteristic "S21" of the power-supplying coil 21 and power-supplying resonator 22 and the power-receiving resonator 32 and the power-receiving coil 31 (i.e., the power-supplying module 2 and the power-receiving module 3) exhibits a single-hump characteristic. Next described is the magnetic field space G1 or G2 in a case where the power-supplying resonator 22 and the power-receiving resonator 32 are set so their transmission characteristic "S21" has two peak bands, and where the transmission characteristic "S21" of the power-supplying coil 21 and power-supplying resonator 22 and the power-receiving resonator 32 and the power-receiving coil 31 (i.e., the power-supplying module 2 and the power-receiving module 3) exhibits a multiple-hump characteristic (double-hump characteristic in the present embodiment).

First, as in the case of the single-hump characteristic, the transmission characteristic "S21" of the power-supplying resonator 22 and the power-receiving resonator 32 is analyzed by using the network analyzer 110, with various power-source frequency of AC power to be supplied. As indicated by the solid line 150 of FIG. 15, the transmission characteristic "S21" of the power-supplying resonator 22 and the power-receiving resonator 32 had the peak band (f(Low P)) of the low frequency side at 12.53 MHz, and the peak band (f(High P)) of the high frequency side at 12.73 MHz. As should be seen, the transmission characteristic "S21" of the power-supplying resonator 22 and the power-receiving resonator 32 had two peak bands, as in the case of the single-hump characteristic.

Figure 15:
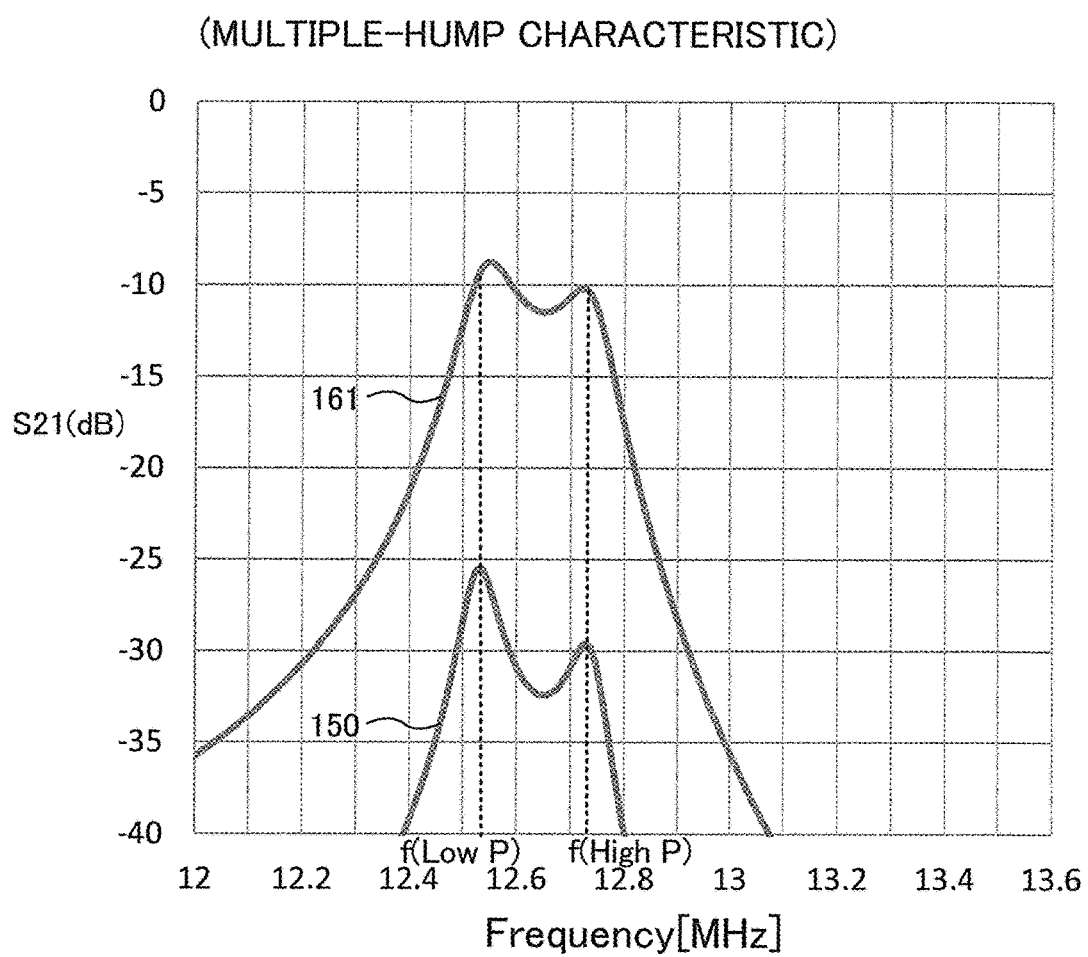
FIG. 15 is a graph indicating a relation of the transmission characteristic "S21" to a power-source frequency in cases of a multiple-hump characteristic.

Further, the setting is such that the analysis-result waveform exhibits a double-hump characteristic (multiple-hump characteristic) with its peaks occurring in two positions nearby 12.54 MHz and 12.72 MHz, as indicated by the solid line 161 in FIG. 15, in the transmission characteristic "S21" of the power-supplying coil 21 and the power-supplying resonator 22 and the power-receiving resonator 32 and the power-receiving coil 31 (i.e., the power-supplying module 2 and the power-receiving module 3). The power-source frequencies of the two peaks substantially match with the peak band (f(Low P)) on the low frequency side and the peak band (f(High P)) on the high frequency side of the transmission characteristic "S21" of the power-supplying resonator 22 and the power-receiving resonator 32. It should be noted that, to conduct a measurement with a double-hump transmission characteristic "S21" of the power-supplying coil 21 and the power-supplying resonator 22 and the power-receiving resonator 32 and the power-receiving coil 31 (i.e., the power-supplying module 2 and the power-receiving module 3), the distance d23 between the power-supplying resonator 22 and the power-receiving resonator 32 was set to 120 mm, the distance d12 between the power-supplying coil 21 and the power-supplying resonator 22 was set to 50 mm, and the distance d34 between the power-receiving resonator 32 and the power-receiving coil 31 was set to 50 mm, in the above wireless power transmission apparatus 1.

Next, the power-source frequency of AC power to be supplied to the power-supplying module 2 of the above wireless power transmission apparatus 1 was set to 12.5 MHz (f(Low P)) and 12.7 MHz (f(High P)), and distribution of the magnetic field strengths around the power-supplying resonator 22 and the power-receiving resonator 32 was analyzed by means of electromagnetic analysis. The magnetic field strengths are indicated in different color tones and shown as analysis results in FIG. 16.

Figure 16:
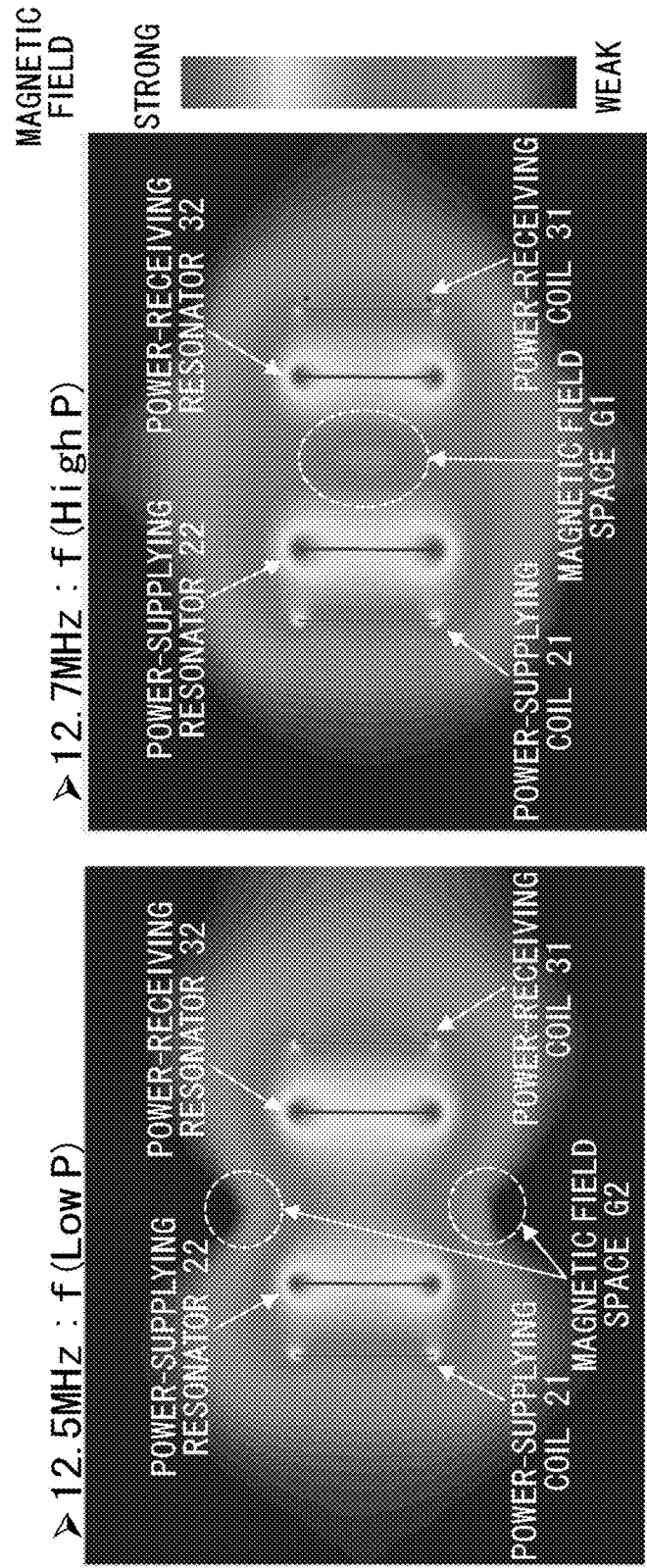
FIG. 16 is a diagram showing distribution of magnetic field strength in cases of a multiple-hump characteristic, which is measured by using an electromagnetic analyzer.

From this distribution of magnetic field strengths shown in FIG. 16, in the case of 12.5 MHz (f(Low P)), a magnetic field space G2 was confirmed outside the power-supplying resonator 22 and the power-receiving resonator 32, the magnetic field space G2 having a smaller magnetic field strength than the surrounding magnetic field strength, and less affected by magnetic fields (The magnetic field strength of the magnetic field space G2 was also relatively smaller as compared with the magnetic field strength outside the power-supplying resonator 22 and the power-receiving resonator 32, in the case of 12.7 MHz (f(High P)) shown in FIG. 16). Further, in the case of 12.7 MHz, a magnetic field space G1 was confirmed between the power-supplying resonator 22 and the power-receiving resonator 32, the magnetic field space G1 having a smaller magnetic field strength than the surrounding magnetic field strength, and less affected by magnetic fields (The magnetic field strength of the magnetic field space G1 was also relatively smaller as compared with the strength of the magnetic field between the power-supplying resonator 22 and the power-receiving resonator 32, in the case of 12.5 MHz (f(Low P)) shown in FIG. 16).

From the above, the following is understood. Suppose the transmission characteristic "S21" of the power-supplying coil 21, the power-supplying resonator 22, the power-receiving resonator 32, and the power-receiving coil 31 has a multiple-hump characteristic. Even in such a case, it is possible to form a magnetic field space G1 between the power-supplying resonator 22 and the power-receiving resonator 32, the magnetic field strength G1 having a smaller magnetic field strength than the surrounding magnetic field strength, and less affected by a magnetic field. To do so, setting is carried out so that the transmission characteristic "S21" of the power-supplying resonator 22 and the power-receiving resonator 32 has two peak bands, and the power-source frequency is set to one that corresponds to the peak band (f(High P)) formed on the high frequency side of the two peak bands. Further, by setting the power-source frequency to one that corresponds to the peak band (f(Low P)) formed on the low frequency side of the two peak bands of the transmission characteristic "S21", it is possible to form the magnetic field space G2 outside the power-supplying resonator 22 and the power-receiving resonator 32, the magnetic field space G2 having a smaller magnetic field strength than that of the surrounding magnetic field and less affected by the magnetic field.

(Effect to Transmission Characteristic "S21" in Magnetic Field Space G1 or G2: Verification with Iron or Copper Piece)

The following verification took place where the transmission characteristic "S21" of the power-supplying coil 21, the power-supplying resonator 22, the power-receiving resonator 32, and the power-receiving coil 31 had a multiple-hump characteristic. Electronic devices such as a stabilizer circuit 7, a charging circuit 8, and a rechargeable battery 9 were arranged between or outside the power-supplying resonator 22 and the power-receiving resonator 32. Then, study was conducted whether or not this arrangement of electronic devices affected the transmission characteristic "S21" of the power-supplying coil 21, the power-supplying resonator 22, the power-receiving resonator 32, and the power-receiving coil 31 (wireless power transmission apparatus 1), i.e., the power transmission efficiency of the wireless power transmission apparatus.

(Iron Piece Inserted Between Power-Supplying Resonator 22 and Power-Receiving Resonator 32: Multiple-Hump Characteristic)

Assuming that an iron piece 60 as the electronic devices such as a stabilizer circuit 7, a charging circuit 8, and a rechargeable battery 9, the iron piece 60 was inserted between the power-supplying resonator 22 and the power-receiving resonator 32. Then, effects of the iron piece 60 was verified through measurement of the transmission characteristic "S21" of the power-supplying coil 21, the power-supplying resonator 22, the power-receiving resonator 32, and the power-receiving coil 31 (see FIG. 11). As the iron piece 60 is used a cylindrical iron piece of 10 mm in thickness and 40 mm in diameter, as shown in FIG. 11.

While the iron piece 60 was inserted between the power-supplying resonator 22 and the power-receiving resonator 32, the transmission characteristic "S21" of the power-supplying coil 21, the power-supplying resonator 22, the power-receiving resonator 32, and the power-receiving coil 31 was analyzed while varying the power-source frequency of AC power supplied to power-supplying module 2. The following will describe, in combination, the transmission characteristic "S21" of the power-supplying coil 21, the power-supplying resonator 22, the power-receiving resonator 32, and the power-receiving coil 31, without the iron piece 60 inserted between the power-supplying resonator 22 and the power-receiving resonator 32 (see solid line 161 of FIG. 17).

Figure 17:
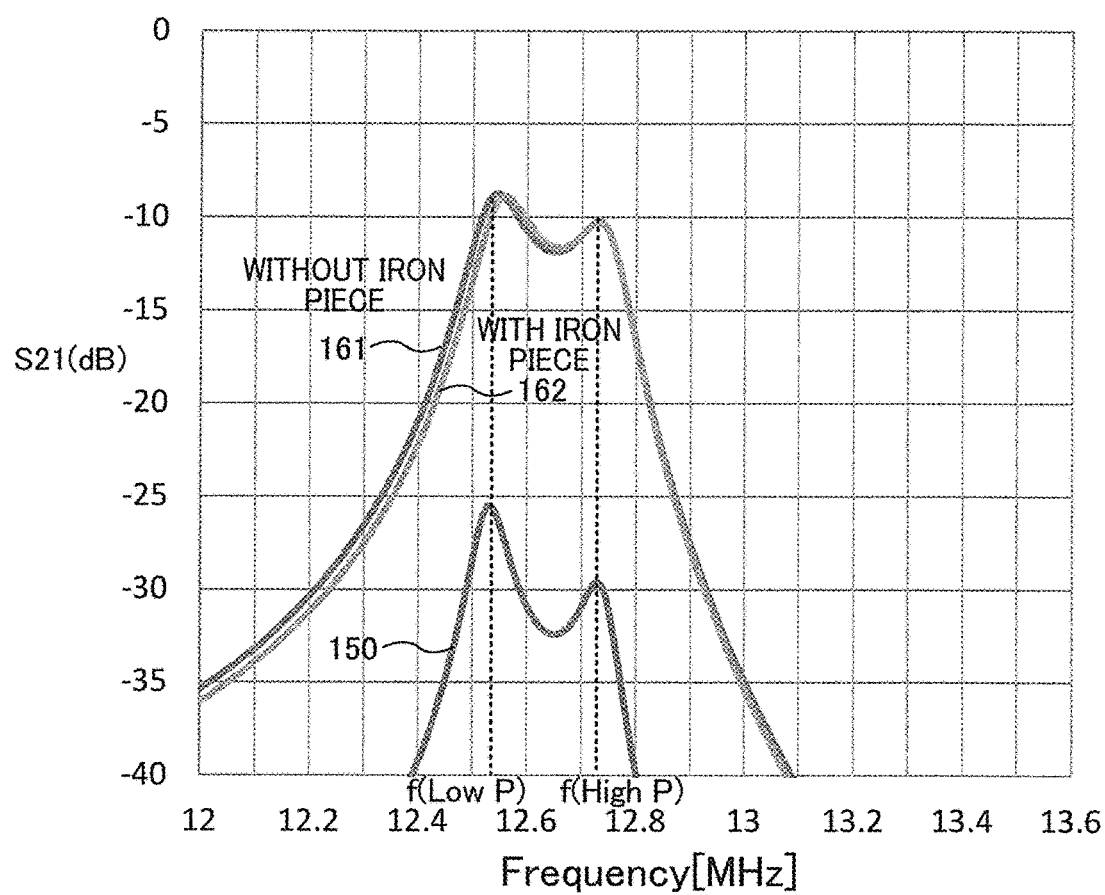
FIG. 17 is a graph indicating a relation of the transmission characteristic "S21" with respect to a power-source frequency, when an iron piece is inserted (multiple-hump characteristic).

In relation to the wireless power transmission apparatus 1, the analysis-result waveform of the transmission characteristic "S21" in the case of having the iron piece 60 inserted between the power-supplying resonator 22 and the power-receiving resonator 32 (solid line 162 of FIG. 17) and the analysis-result waveform of the transmission characteristic "S21" in the case of inserting not iron piece 60 between the power-supplying resonator 22 and the power-receiving resonator 32 (solid line 161 of FIG. 17) were compared with each other. While the transmission characteristic "S21" shown by the solid line 161 (without iron piece 60) was −9.0 dB at 12.53 MHz (f(Low P)), the transmission characteristic "S21" indicated by the solid line 162 (with iron piece 60) was −10.0 dB at 12.53 MHz (f(Low P)), as shown in FIG. 17. This indicates that, while the power-source frequency was set to 12.53 MHz (f(Low P)), the transmission characteristic "S21" dropped by 1.0 dB and the power transmission efficiency of the wireless power transmission apparatus 1 was affected, by insertion of the iron piece 60 between the power-supplying resonator 22 and the power-receiving resonator 32.

Meanwhile, the transmission characteristic "S21" indicated by the solid line 161 (without iron piece 60) was −10.2 dB at the 12.73 MHz (f(High P)) and the transmission characteristic "S21" indicated by the solid line 162 (with iron piece) was −10.3 dB at the 12.73 MHz (f(High P)). This indicates that, while the power-source frequency was set to 12.73 MHz (f(High P)), the transmission characteristic "S21" dropped only by 0.1 dB, and the power transmission efficiency of the wireless power transmission apparatus 1 was hardly affected, even when the iron piece 60 was inserted between the power-supplying resonator 22 and the power-receiving resonator 32.

In other words, it is understood as follows. When the power-source frequency was 12.53 MHz (f(Low P)), there was no magnetic field space G1 formed between the power-supplying resonator 22 and the power-receiving resonator 32, as shown in FIG. 16. Therefore, due to the effects from the iron piece 60, the transmission characteristic "S21" dropped, consequently affecting the power transmission efficiency of the wireless power transmission apparatus 1. Meanwhile, when the power-source frequency was 12.73 MHz (f(High P)), the magnetic field space G1 was formed between the power-supplying resonator 22 and the power-receiving resonator 32, as shown in FIG. 16. Since the iron piece 60 was in the magnetic field space G1, the transmission characteristic "S21" was hardly affected by the iron piece 60 and did not drop, and the power transmission efficiency of the wireless power transmission apparatus 1 was hardly affected.

(Copper Piece Arranged Outside Power-Supplying Resonator 22 and Power-Receiving Resonator 32: Multiple-Hump Characteristic)

Assuming that a copper piece 61 as the electronic devices such as a stabilizer circuit 7, a charging circuit 8, and a rechargeable battery 9, the copper piece 61 was arranged outside the power-supplying resonator 22 and the power-receiving resonator 32. Then, effects of the copper piece 61 was verified through measurement of the transmission characteristic "S21" of the power-supplying coil 21, the power-supplying resonator 22, the power-receiving resonator 32, and the power-receiving coil 31 (wireless power transmission apparatus 1) (see FIG. 13). As the copper piece 61 is used a copper piece having a shape of a quadrangular prism of 100 mm×100 mm×1 mm, as shown in FIG. 13. Further, the copper piece 61 is positioned 30 mm away from the power-supplying resonator 22 and the power-receiving resonator 32, as shown in FIG. 13.

While the copper piece 61 was arranged outside the power-supplying resonator 22 and the power-receiving resonator 32, the transmission characteristic "S21" of the power-supplying coil 21, the power-supplying resonator 22, the power-receiving resonator 32, and the power-receiving coil 31 was analyzed while varying the power-source frequency of AC power supplied to power-supplying module 2. The following will describe, in combination, the transmission characteristic "S21" of the power-supplying coil 21, the power-supplying resonator 22, the power-receiving resonator 32, and the power-receiving coil 31, without the copper piece 61 arranged outside the power-supplying resonator 22 and the power-receiving resonator 32 (see solid line 161 of FIG. 18).

Figure 18:
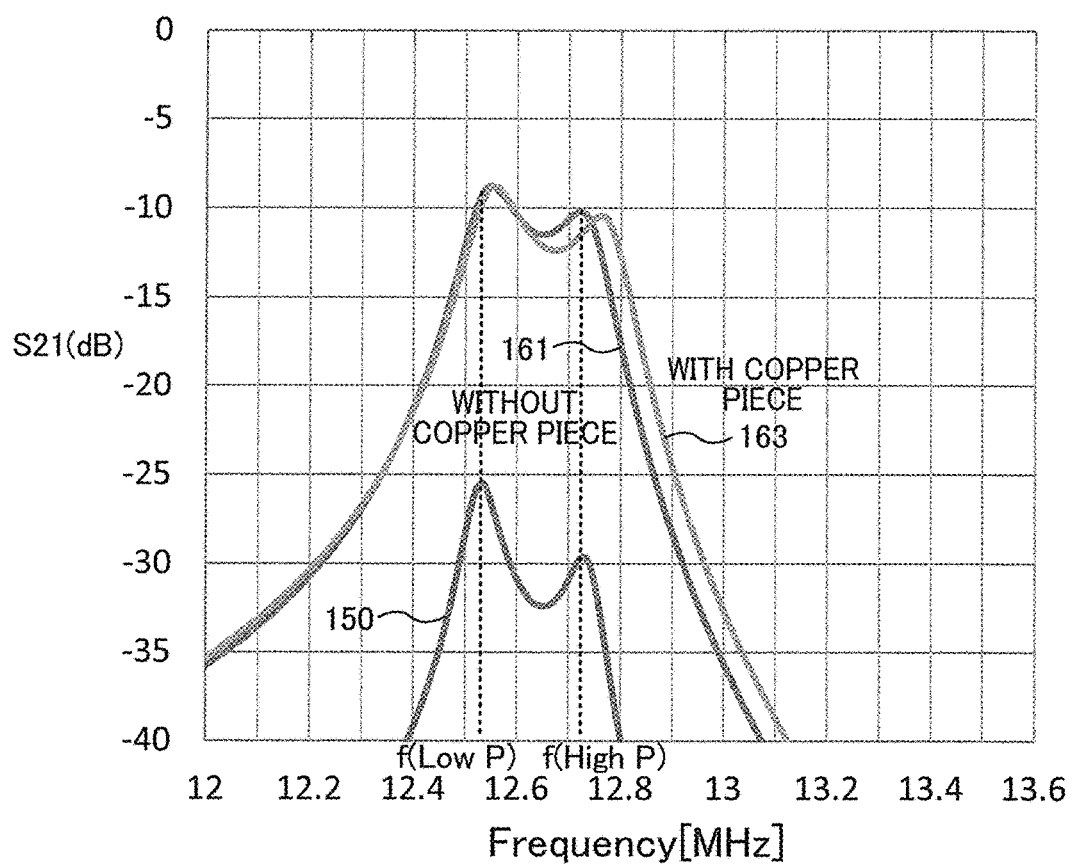
FIG. 18 is a graph indicating a relation of the transmission characteristic "S21" with respect to a power-source frequency, when a copper piece is inserted (multiple-hump characteristic).

In relation to the wireless power transmission apparatus 1, the analysis-result waveform of the transmission characteristic "S21" in the case of having the copper piece 61 arranged outside the power-supplying resonator 22 and the power-receiving resonator 32 (solid line 163 of FIG. 18) and the analysis-result waveform of the transmission characteristic "S21" in the case of arranging no copper piece 61 outside the power-supplying resonator 22 and the power-receiving resonator 32 (solid line 161 of FIG. 18) were compared with each other. While the transmission characteristic "S21" shown by the solid line 161 (without copper piece 61) was −10.2 dB at 12.73 MHz (f(High P)), the transmission characteristic "S21" indicated by the solid line 163 (with copper piece 61) was −11.5 dB at 12.73 MHz (f(High P)), as shown in FIG. 18. This indicates that, while the power-source frequency was set to 12.73 MHz (f(High P)), the transmission characteristic "S21" dropped by 1.3 dB and the power transmission efficiency of the wireless power transmission apparatus 1 was affected, by arranging the copper piece 61 outside the power-supplying resonator 22 and the power-receiving resonator 32.

Meanwhile, the transmission characteristic "S21" indicated by the solid line 161 (without copper piece 61) was −9.0 dB at the 12.53 MHz (f(Low P)) and the transmission characteristic "S21" indicated by the solid line 163 (with copper piece 61) was −9.2 dB at the 12.53 MHz (f(Low P)). This indicates that, while the power-source frequency was set to 12.53 MHz (f(Low P)), the transmission characteristic "S21" dropped only by 0.2 dB, and the power transmission efficiency of the wireless power transmission apparatus 1 was hardly affected, even when the copper piece 61 was inserted between the power-supplying resonator 22 and the power-receiving resonator 32.

In other words, it is understood as follows. When the power-source frequency was 12.73 MHz (f(High P)), there was no magnetic field space G2 formed between the power-supplying resonator 22 and the power-receiving resonator 32, as shown in FIG. 16. Therefore, due to the effects from the copper piece 61, the transmission characteristic "S21" dropped, consequently affecting the power transmission efficiency of the wireless power transmission apparatus 1. Meanwhile, when the power-source frequency was 12.53 MHz (f(Low P)), the magnetic field space G2 was formed between the power-supplying resonator 22 and the power-receiving resonator 32, as shown in FIG. 16. Since the copper piece 61 was in the magnetic field space G2, the transmission characteristic "S21" was hardly affected by the iron piece 61 and did not rise, and the power transmission efficiency of the wireless power transmission apparatus 1 was hardly affected.

In conclusion, it is understood that the transmission characteristic "S21" of the power-supplying coil 21, the power-supplying resonator 22, the power-receiving resonator 32, and the power-receiving coil 31 (wireless power transmission apparatus 1), i.e., the power transmission efficiency of the wireless power transmission apparatus 1 is hardly affected, when a magnetic field space G1 is formed between the power-supplying resonator 22 and power-receiving resonator 32 and when electronic devices such as the stabilizer circuit 7, the charging circuit 8, and the rechargeable battery 9 are arranged in that magnetic field space G1. Similarly, it is understood that the transmission characteristic "S21" of the power-supplying coil 21, the power-supplying resonator 22, the power-receiving resonator 32, and the power-receiving coil 31 (wireless power transmission apparatus 1), i.e., the power transmission efficiency of the wireless power transmission apparatus 1 is hardly affected, when a magnetic field space G2 is formed outside the power-supplying resonator 22 and power-receiving resonator 32 and when electronic devices such as the stabilizer circuit 7, the charging circuit 8, and the rechargeable battery 9 are arranged in that magnetic field space G2.

With the above structure, it is possible to form a magnetic field space G1 or G2 nearby the power-supplying resonator 22 and the power-receiving resonator 32, the magnetic field space G1 or G2 having a magnetic field strength smaller than the strength of the surrounding magnetic field, by carrying out setting so that values of the transmission characteristic "S21" of the power-supplying resonator 22 and the power-receiving resonator 32, at a time of wireless power transmission by means of a resonance phenomenon, have two peak bands, and by setting the power-source frequency of the power to be supplied to the power-supplying module 2 to a power-source frequency band corresponding to anyone of the two peak bands of the transmission characteristic "S21".

By accommodating electronic devices that should be kept away from effects of a magnetic field (stabilizer circuit 7, charging circuit 8, rechargeable battery 9), in the magnetic field space G1 or G2 with a reduced magnetic field strength as compared with the strength of the surrounding magnetic field, the chances of Eddy current occurring due to the magnetic field is reduced or prevented in those electronic devices, and keep the devices away from negative effects stemming from heat generation.

Further, in the above structure, the power-source frequency of the power supplied to the power-supplying module 2 is set to a frequency band corresponding to a peak band (f(High P)), out of the two peak bands of the transmission characteristic "S21", on the high frequency side. This enables formation of a magnetic field space G1 between the power-supplying resonator 22 and the power-receiving resonator 32, the magnetic field space G1 having a magnetic field strength smaller than the strength of the surrounding magnetic field.

Further, in the above structure, the power-source frequency of the power supplied to the power-supplying module 2 is set to a frequency band corresponding to a peak band (f(Low P)), out of the two peak bands of the transmission characteristic "S21", on the low frequency side. This enables formation of a magnetic field space G2 outside the power-supplying resonator 22 and the power-receiving resonator 32, the magnetic field space G2 having a magnetic field strength smaller than the strength of the surrounding magnetic field.

Further, in the above structure, setting is carried out so that values of the transmission characteristic "S21" with respect to the power-source frequencies of the power, of the power-supplying module 2 (power-supplying coil 21, power-supplying resonator 22) and the power-receiving module 3 (power-receiving coil 31, power-receiving resonator 32), have a single-hump characteristic which exhibits a single peak. This maximizes the transmission characteristic "S21". Being able to maximize the transmission characteristic means the power transmission efficiency from the power-supplying module 2 to the power-receiving module 3 is maximized. Therefore, it is possible improve the power transmission efficiency of the wireless power transmission, while forming the magnetic field space G1 or G2.

Further, in the above structure, setting is carried out so that values of the transmission characteristic "S21" with respect to the power-source frequencies of the power, of the power-supplying module 2 (power-supplying coil 21, power-supplying resonator 22) and the power-receiving module 3 (power-receiving coil 31, power-receiving resonator 32), have a double-hump characteristic which exhibits two peaks. Thus, by setting the power-source frequency nearby a peak, it is possible to improve the power transmission efficiency of wireless power transmission, while forming the magnetic field space G1 or G2.

(Changing Size of Magnetic Field Space G1 or G2)

Thus, a method of forming a magnetic field space G1 or G2 is described hereinabove. The following describes the size of the magnetic field space G1 or G2 formed is adjustable.

The size of the magnetic field space G1 or G2 are adjustable by adjusting the strength of coupling by a magnetic field (magnetic coupling) between the power-supplying resonator 22 of the power-supplying module 2 and the power-receiving resonator 32 of the power-receiving module 3. The magnetic coupling is modified by, for example, modifying parameters related to the power-supplying coil 21 and the power-supplying resonator 22 of the power-supplying module 2, and the power-receiving coil 31 and the power-receiving resonator 32 of the power-receiving module 3. Exemplary ways of modifying these adjustment parameters include: modifying the positional relation of the power-supplying coil 21 and the power-supplying resonator 22 of the power-supplying module 2; modifying the positional relation of the power-receiving coil 31 and the power-receiving resonator 32 of the power-receiving module 3; modifying an amount of power supplied to the power-supplying module 2; and changing the capacities and inductances of elements (capacitors and coils) of the power-supplying resonator 22 and the power-receiving resonator 32.

According to the above, the size of the magnetic field space G1 is adjustable by adjusting the strength of magnetic coupling occurring between the power-supplying resonator 22 and the power-receiving resonator 32, through modification of one or more adjustment parameters related to the power-supplying module 2 and the power-receiving module 3. For example, the size of the magnetic field space G1 or G2 is reduced by relatively weakening the magnetic coupling occurring between the power-supplying module 2 and the power-receiving module 3. On the other hand, the sizes of the magnetic field space G1 or G2 is increased by relatively strengthening the magnetic coupling occurring between the power-supplying module and the power-receiving module. As described, the size of the magnetic field space is adjustable according to the size of an electronic device that needs to be kept away from effects from a magnetic field.

For example, the size of the magnetic field space G1 or G2 is adjustable by adjusting the positional relation of the power-supplying coil 21 and the power-supplying resonator 22 of the power-supplying module 2, the positional relation of the power-receiving coil 31 and the power-receiving resonator 32 of the power-receiving module 3, i.e., by modifying parameters of the distances d12 and d34, where the distance d12 is the distance between the power-supplying coil 21 and the power-supplying resonator 22 and the distance d34 is the distance between the power-receiving resonator 32 and the power-receiving coil 31.

With the above structure, the size of the magnetic field space G1 or G2 is adjustable by adjusting the strength of the magnetic coupling, through modification of at least one of the distance d12 between the power-supplying coil 21 and the power-supplying resonator 22 and the distance d34 between the power-receiving resonator 32 and the power-receiving coil 31.

Other Embodiments

Although the above description deals with a charger 101 and an RF headset 102 as an example, the method is applicable to any devices having a rechargeable battery; e.g., tablet PCs, digital cameras, mobile phones, earphone-type music player, hearing aids, and sound collectors.

Further, in the above description, the rechargeable battery 9 was given as an example of a device to which power is supplied; however, it is possible to adopt, as the device to which power is supplied, a machine that directly consumes power for its operation.

Further, although the above description assumes the power-supplying module 2 and the power-receiving module 3 are mounted in a portable electronic device, the use of such an apparatus is not limited to small devices. For example, with a modification to the specifications according to the required power amount, the power-supplying module 2 and the power-receiving module 3 are mountable to a relatively large system such as a wireless charging system in an electronic vehicle (EV), or to an even smaller device such as a wireless endoscope for medical use.

(Changing Shape of Magnetic Field Space)

Further, the above embodiment described that formation of magnetic field spaces G1 or G2 is possible. It should be noted that it is further possible to change the size of the magnetic field spaces G1 or G2. This is described below.

To change the shape of the magnetic field space G1 or G2, for example, the degree of coupling (magnetic coupling) of magnetic fields between or around the power-supplying coil 21, the power-supplying resonator 22, and magnetic fields between or around the power-receiving resonator 32 and the power-receiving coil 31 is changed. To cause a change in the magnetic coupling, the shapes of coils of the power-supplying coil 21, the power-supplying resonator 22, the power-receiving coil 31, and the power-receiving resonator 32 are changed.

According to the method above, by causing the power-supplying coil 21 and the power-supplying resonator 22 and the power-receiving coil 31 and the power-receiving resonator 32 to have desired shapes, a magnetic field space G1 or G2 having a relatively low magnetic field strength is formed with a desired shape corresponding to the shapes of the power-supplying coil 21 and the power-supplying resonator 22 and the power-receiving coil 31 and the power-receiving resonator 32. That is to say, by changing the shapes of the power-supplying coil 21 and the power-supplying resonator 22 and the power-receiving coil 31 and the power-receiving resonator 32 of the power-receiving module 3, it is possible to change the shape of the magnetic field space G1 or G2 having a relatively low magnetic field strength.

Although the above descriptions have been provided with regard to the characteristic parts so as to understand the present invention more easily, the invention is not limited to the embodiments and the examples as described above and can be applied to the other embodiments and examples, and the applicable scope should be construed as broadly as possible. Furthermore, the terms and phraseology used in the specification have been used to correctly illustrate the present invention, not to limit it. Further, it will be obvious for those skilled in the art that the other structures, systems, methods or the like are possible, within the spirit of the invention described in the present specification. Accordingly, it should be considered that claims cover equivalent structures, too, without departing from the technical idea of the present invention. In addition, it is desirable to sufficiently refer to already-disclosed documents and the like, in order to fully understand the objects and effects of the present invention.

REFERENCE SIGNS LIST

1: Wireless Power Transmission Apparatus
2: Power-Supplying Module
3: Power-Receiving Module
6: AC power source
7: Stabilizer Circuit
8: Charging Circuit
9: Rechargeable Battery
10: Target Device (Device to be Powered)
21: Power-Supplying Coil
22: Power-Supplying Resonator
31: Power-Receiving Coil
32: Power-Receiving Resonator
101: Charger
102: RF Headset
110: Network Analyzer
G1, G2: Magnetic Field Space

The invention claimed is:

1. A wireless power transmission apparatus configured to supply power from a power-supplying module comprising at least a power-supplying resonator to a power-receiving module comprising at least a power-receiving resonator, by means of a resonance phenomenon, wherein setting is carried out so that a transmission characteristic with respect to the power-source frequency of the power, of the power-supplying resonator and the power-receiving resonator, has two peak bands, the power-source frequency of the power to be supplied to the power-supplying module is set to a power-source frequency band corresponding to any of the two peak bands of the transmission characteristic, thereby forming a magnetic field space nearby the power-supplying resonator and the power-receiving resonator, the magnetic field space having a magnetic field strength smaller than a strength of a surrounding magnetic field, and at least one of an electronic component and a rechargeable battery being provided in the magnetic field space.

2. The wireless power transmission apparatus according to claim 1, wherein the power-source frequency of the power supplied to the power-supplying module is set to a frequency band corresponding to a peak band, out of the two peak bands of the transmission characteristic, on a high frequency side, and the magnetic field space is formed on inner circumferential sides of the power-supplying resonator and the power-receiving resonator.

3. The wireless power transmission apparatus according to claim 1, wherein the power-source frequency of the power supplied to the power-supplying module is set to a frequency band corresponding to a peak band, out of the two peak bands of the transmission characteristic, on a low frequency side, the magnetic field space is formed on outer circumferential sides of the power-supplying resonator and the power-receiving resonator.

4. The wireless power transmission apparatus, according to claim 1, wherein:

the power-supplying module comprises at least a power-supplying coil and the power-supplying resonator, the power-receiving module comprises at least the power-receiving resonator and a power-receiving coil, and setting is carried out so that the transmission characteristic with respect to the power-source frequencies of the power, of the power-supplying module and the power-receiving module, has a single-hump characteristic which exhibits a single peak.

5. The wireless power transmission apparatus, according to claim 1, wherein:

the power-supplying module comprises at least a power-supplying coil and the power-supplying resonator, the power-receiving module comprises at least the power-receiving resonator and a power-receiving coil, and setting is carried out so that the transmission characteristic with respect to the power-source frequency of the power, of the power-supplying module and the power-receiving module, has a double-hump characteristic which exhibits at least two peaks.

6. The wireless power transmission apparatus according to claim 5, wherein the size of the magnetic field space is adjusted by adjusting the strength of magnetic coupling occurring between the power-supplying resonator and the power-receiving resonator, through modification of one or more adjustment parameters related to the power-supplying module and the power-receiving module.

7. The wireless power transmission apparatus according to claim 6, wherein the one or more adjustment parameters include at least one of the distance between the power-supplying coil and the power-supplying resonator and the distance between the power-receiving resonator and the power-receiving coil.

8. A method of forming a magnetic field space in a wireless power transmission apparatus configured to supply power from a power-supplying module comprising at least a power-supplying resonator to a power-receiving module comprising at least a power-receiving resonator, by means of a resonance phenomenon, wherein setting is carried out so that a transmission characteristic with respect to the power-source frequency of the power, of the power-supplying resonator and the power-receiving resonator, has two peak bands, the power-source frequency of the power to be supplied to the power-supplying module is set to a power-source frequency band corresponding to any of the two peak bands of the transmission characteristic, thereby forming a magnetic field space between the power-supplying resonator and the power-receiving resonator, the magnetic field space having a magnetic field strength smaller than a strength of a surrounding magnetic field, and at least one of an electronic component and a rechargeable battery being provided in the magnetic field space.

* * * * *